US012557818B2

(12) United States Patent
Meulendijks et al.

(10) Patent No.: US 12,557,818 B2
(45) Date of Patent: Feb. 24, 2026

(54) CLEANING OF FOOD PRODUCT MOULDING INSERTS

(71) Applicants: MAREL FURTHER PROCESSING B.V., Boxmeer (NL); MAREL FRANCE, Baud (FR)

(72) Inventors: Johannes Martinus Meulendijks, Deurne (NL); Jacques Le Paih, Plumeliau (FR); Yohann Julien Victor Pierre, Kervignac (FR); Fabrice Le Pabic, Baud (FR)

(73) Assignees: MAREL FURTHER PROCESSING B.V., Boxmeer (NL); MAREL FRANCE, Baud (FR)

( * ) Notice: Subject to any disclaimer, the term of this patent is extended or adjusted under 35 U.S.C. 154(b) by 1049 days.

(21) Appl. No.: 17/437,245

(22) PCT Filed: Mar. 5, 2020

(86) PCT No.: PCT/NL2020/050140
§ 371 (c)(1),
(2) Date: Sep. 8, 2021

(87) PCT Pub. No.: WO2020/185067
PCT Pub. Date: Sep. 17, 2020

(65) Prior Publication Data
US 2022/0167633 A1 Jun. 2, 2022

(30) Foreign Application Priority Data

Mar. 11, 2019 (NL) ...................................... 2022720
Mar. 13, 2019 (NL) ...................................... 2022735

(51) Int. Cl.
A22C 7/00 (2006.01)
A23G 1/28 (2006.01)
(Continued)

(52) U.S. Cl.
CPC .......... *A22C 7/0069* (2013.01); *A22C 7/0046* (2013.01); *A22C 7/0076* (2013.01);
(Continued)

(58) Field of Classification Search
CPC ........... B08B 3/02; B08B 9/00; B08B 9/0804; B08B 9/0821; A22C 7/0069;
(Continued)

(56) References Cited

U.S. PATENT DOCUMENTS 9,162,375 B2    10/2015   Van Gerwen
9,637,365 B2     5/2017   Van Gerwen
(Continued)

FOREIGN PATENT DOCUMENTS

CN          103429090 A      12/2013
CN          107404885 A      11/2017
(Continued)

OTHER PUBLICATIONS

EP0578058B1 Espacenet Machine Translation (Year: 2024).*
(Continued)

*Primary Examiner* — Joseph S Del Sole
(74) *Attorney, Agent, or Firm* — Workman Nydegger

(57) ABSTRACT

A method is provided for cleaning food product molding inserts that have been temporarily detached from a movable mold member of a molding device that is configured for molding food products from a pumpable foodstuff mass.

9 Claims, 16 Drawing Sheets

(51) Int. Cl.
  *B08B 3/02*          (2006.01)
  *B08B 9/00*          (2006.01)
  *B08B 9/08*          (2006.01)

(52) U.S. Cl.
  CPC .............. *A22C 7/0092* (2013.01); *A23G 1/28*
    (2013.01); *B08B 3/02* (2013.01); *B08B 9/00*
    (2013.01); *B08B 9/0804* (2013.01)

(58) Field of Classification Search
  CPC ............... A22C 7/0046; A22C 7/0076; A22C
    7/0092; A23G 1/28; A23P 30/10; F16C
    13/00; B66F 9/187; B66F 9/065; B30B
    11/12; B30B 11/18
  See application file for complete search history.

(56)             References Cited

U.S. PATENT DOCUMENTS

| | | | |
|---|---|---|---|
| 9,944,504 B2 | 4/2018 | Van Gerwen | |
| 10,370,229 B2 | 8/2019 | Van Gerwen | |
| 10,609,933 B2 | 4/2020 | Verhoeven et al. | |
| 2007/0007694 A1* | 1/2007 | Nemoto | B29B 11/12 |
| | | | 264/319 |
| 2009/0320882 A1* | 12/2009 | Averwater | B08B 13/00 |
| | | | 99/482 |
| 2011/0061690 A1* | 3/2011 | Seger | B29C 33/72 |
| | | | 414/800 |
| 2013/0125767 A1* | 5/2013 | Shoshan | A23L 13/67 |
| | | | 99/441 |
| 2013/0273192 A1* | 10/2013 | Van Gerwen | B30B 11/12 |
| | | | 425/317 |
| 2013/0337128 A1* | 12/2013 | Van Gerwen | A22C 7/0038 |
| | | | 156/60 |
| 2015/0282520 A1* | 10/2015 | Meskendahl | B08B 1/50 |
| 2015/0343671 A1 | 12/2015 | Van Gerwen | |
| 2015/0344275 A1 | 12/2015 | Van Gerwen | |
| 2016/0023251 A1* | 1/2016 | Mitsue | B25J 19/0075 |
| | | | 134/133 |
| 2018/0215596 A1 | 8/2018 | Van Gerwen | |
| 2019/0116813 A1* | 4/2019 | Verhoeven | B08B 9/0804 |
| 2020/0108424 A1* | 4/2020 | Kunitomo | B08B 3/10 |
| 2020/0163348 A1 | 5/2020 | Verhoeven et al. | |
| 2021/0001582 A1* | 1/2021 | Zecher | A22C 7/0061 |

FOREIGN PATENT DOCUMENTS

| | | | | |
|---|---|---|---|---|
| DE | 0578058 B1 * | 1/1997 | | B08B 3/00 |
| EP | 3072395 A2 | 9/2016 | | |
| WO | 2004002229 A2 | 1/2004 | | |
| WO | 2005107481 A2 | 11/2005 | | |
| WO | 2012161577 A1 | 11/2012 | | |
| WO | 2013164387 A1 | 11/2013 | | |
| WO | 2015012690 A2 | 1/2015 | | |
| WO | 2017155390 A1 | 9/2017 | | |
| WO | 2018099861 A1 | 6/2018 | | |
| WO | 2018117831 A1 | 6/2018 | | |

OTHER PUBLICATIONS

Search Report and Written Opinion from corresponding Dutch Application No. 2022720, Sep. 16, 2019.

International Search Report and Written Opinion from PCT Application No. PCT/NL2020/050140, Apr. 17, 2020.

Office Communication from corresponding Chinese Application No. 2020800191337, Mar. 31, 2022.

* cited by examiner

CLEANING OF FOOD PRODUCT MOULDING INSERTS

BACKGROUND

The present invention relates to the field of moulding of food products, wherein use is made of a moulding device having a movable mould member. The moulding device is configured for moulding food products from a pumpable foodstuff mass.

For example, WO2004/002229 discloses a moulding device for moulding food products from a pumpable foodstuff mass. This known moulding device comprises:
  a frame,
  a movable mould member that is movably supported by the frame,
  a mould member drive which is coupled to the movable mould member in order to drive the mould member in a direction of movement along a path,
  a mass feed member which is arranged at a fill position along said path, said mass feed member having an inlet connected to a pump for the foodstuff mass and having a discharge mouth with one or more openings, said mass feed member being adapted to transfer mass into passing mould cavities of the movable mould member, said mass forming a food product in said mould cavity.
WO2004/002229 discloses various embodiments wherein the mobile mould member is provided with inserts that are detachable from a base structure of the mobile mould member, also referred to as a mould member base. In WO2004/002229 it is disclosed that a detachable insert has:
  an outer face,
  one or more recessed mould cavities, each mould cavity defining a shape of the product, which is to be moulded, the one or more mould cavities each having an opening in the outer face for the introduction of foodstuff mass into the mould cavity and for the ejection of the moulded product,
  an inner face, and
  a permeable volume between the inner face and the one or more mould cavities, said permeable volume comprising fine openings opening out at the one or more mould cavities of the insert. For example, the permeable volume is formed by porous sintered metal, e.g. of sintered stainless steel, from which at least a portion of the insert is fabricated. In another embodiment, also contemplated within the context of the present invention, the permeable body is created by machining fine orifices between the inner face and the face delimiting the mould cavity. In yet another embodiment, also contemplated within the context of the present invention, the permeable volume can be made by a 3D printing technique, e.g. of plastic material, e.g. printing layer upon layer and creating the permeability in said printing process.
In WO2004/002229 it is further disclosed that, in embodiments also contemplated within the context of the present invention, the moulding device comprises a food product ejection system based on the use of a pressurized ejection fluid. This ejection system comprises a pressurized ejection fluid source, e.g. a pressurized air source, e.g. comprising an air compressor and a storage tank wherein pressurized air is stored. The system is operated to feed pressurized ejection fluid, e.g. air, to the inner face of the insert attached to the mobile mould member at the moment when the mould cavity is at an ejection position along the path of the movable mould member. Hereby the pressurized ejection fluid passes from the inner face of an insert through the permeable volume to the mould cavity in order to assist or cause the release of the food product formed in the mould cavity from the insert. For example, also within the context of the present invention, several inserts, e.g. in a linear row or helical row in a drum mould member, are in communication with a common channel in the mould member base, and a burst of pressurized ejection fluid, e.g. controlled by a valve of the system, is fed into an inlet of said channel when the ejection position is reached so that all food products in cavities communicating with said channel are released from their respective cavity.

In WO2004/002229 it is further disclosed, in embodiments also contemplated within the context of the present invention, that the installation of which the moulding device forms a part comprises a discharge system that is adapted to receive the ejected food products and to discharge said food products. For example, the installation comprises a discharge conveyor, e.g. a belt conveyor, extending underneath an ejection position of the moulding device so that ejected products drop onto the conveyor to be conveyed onwards. For example, the products are then fed to one or more of a coating device, an oven, a freezer, and/or a packaging installation. In an embodiment the conveyor is configured and operated to stack or shingle food products. An embodiment packaging container is placed on the conveyor so that the ejected food products are directly received in one or more packaging containers, e.g. in one or more stacks in a packaging container.

As shown for example in WO2004/002229, in embodiments also contemplated within the context of the present invention, the mould member is part of a drum moulding device, wherein the mould member is embodied as a rotary mould drum that is rotatably supported by the frame, e.g. the drum rotation axis being horizontal, wherein the mould drum drive is in operation coupled to the drum to drive the drum in a rotation direction. In embodiments, the mould drum drive operates at a continuous speed, rotating the mould drum at a constant speed. It is also conceivable that the mould drum drive operates intermittently, allowing a mould cavity to stop, or nearly stop, opposite the mouth of the mass feed member and start rotating again after the mould cavity has been filled.

In another embodiment, also contemplated within the context of the present invention, the movable mould member is part of a plateformer type moulding device, wherein the mould member is embodied as a plate shaped mould member that is reciprocated, commonly in a horizontal plane, between a fill position and an ejection position. Commonly the mould member has one row, or possibly two parallel rows, of mould cavities, generally perpendicular to the direction of the reciprocating motion of the plate shaped mould member. In embodiments, the openings of the cavities are on the underside of the plate shaped mould member so that transfer of foodstuff mass into the cavities is performed from below by means of an appropriate mass feed member. In the latter embodiment, at the ejection location, ejection fluid, e.g. pressurized air, is fed to the inner face(s) of the one or more inserts of the plate shaped mould member, to assist in the release of the formed food products.

In another embodiment, also contemplated within the context of the present invention, the movable mould member is part of a turret type moulding device, wherein the movable mould member is a disc shaped mould member that revolves about a vertical axis, e.g. with an intermittent motion, wherein the disc shaped mould member is provided with one or more circular arrays of mould cavities, e.g. each cavity being formed by a respective detachable insert. In embodiments, the openings of the cavities are on the underside of the revolving disc shaped mould member so that transfer of foodstuff mass into each cavity is performed from below by means of an appropriate mass feed member. In the latter embodiment, at the ejection location, ejection fluid, e.g. pressurized air, is fed to the inner face of the insert of the mould member, to assist in the release of the formed food product.

In embodiments, also contemplated within the context of the present invention, the pump for the foodstuff mass that is connected to the inlet of the mass feed member is operated on the basis of a pressure control, e.g. a sensor detecting the pressure in the mass feed member and/or in the mould cavity that is being filled. It is also conceivable that the pump for the foodstuff mass operates based on the relative position of a mould cavity and a mouth of the mass feed member, e.g. as described in WO2012161577.

The production of the food products causes the inserts to become soiled over time, e.g. as fatty or other substances stick onto the face of the mould cavity or even soiling within the permeable volume, e.g. in a zone adjoining said surface, takes place. This may cause clogging of the permeable volume, e.g. at and/or near said surface or elsewhere. In particular due to the presence of the permeable volume in an insert between the inner face thereof and the one or more mould cavities thereof, which permeable volume comprises fine openings opening out at the one or more mould cavities of the insert, a thorough regular cleaning is desired or necessitated, e.g. in between production shifts, e.g. during night-time interruption of production.

SUMMARY

The present invention aims to provide measures that allow for enhancements, in particular in respect of cleaning, for instance in relation to one or more of: the quality of cleaning, the time required for cleaning, the use of cleaning liquid and any agents forming part of the cleaning liquid, the total time between stopping production and taking up production after cleaning, the general efficiency of the production of food products with an installation as described herein, the logistics, the monitoring and/or logging of the cleaning, etc.

The invention provides a method for cleaning food product moulding inserts that have been temporarily detached from a movable mould member of a moulding device of an installation that is configured for moulding food products from a pumpable foodstuff mass.

Each food product moulding insert is embodied to be detachable from a movable mould member of a moulding device that is configured for moulding food products from a pumpable foodstuff mass. The insert has:
an outer face,
one or more recessed mould cavities, each mould cavity defining a shape of the product, which is to be moulded, the mould cavities each having an opening in the outer face for the introduction of foodstuff mass into the mould cavity and for the ejection of the moulded product,
an inner face,
a permeable volume between the inner face and the one or more mould cavities, said permeable volume comprising openings opening out at the one or more mould cavities of the insert,
such that each mould cavity of the insert is delimited at least in part by a permeable volume, to allow for, in operation of the moulding device, passing of pressurized ejection fluid from the inner face through the permeable volume to the mould cavity in order to assist release of the food product formed in the mould cavity from the insert.

In the method use is made of an inserts cleaning device that comprises:
an inserts carrier configured to temporarily mount thereon multiple inserts at respective insert mounting positions,
one or more cleaning liquid feed ducts,
a pump connected to the one or more cleaning liquid feed ducts, the one or more liquid feed ducts leading from the pump to the mounting positions of the inserts carrier,
a collector device for collecting cleaning liquid,
a cleaning liquid recirculation assembly extending from the collector device to the pump,
a filter device arranged in the cleaning liquid recirculation assembly.

The method comprises:
mounting the inserts at the respective mounting positions on the inserts carrier, so that the inner or outer faces thereof, preferably the inner faces thereof, adjoin the one or more cleaning liquid feed ducts,
operating the pump so as to feed pressurized cleaning liquid to the one or more mounting locations, so that said cleaning liquid is forced through the permeable body of each insert,
collecting by means of the collector device the cleaning liquid exiting the inserts,
recirculating the collected cleaning liquid via the recirculation assembly back to the pump, and, preferably, filtering the liquid by means of the filter device,
dismounting the cleaned inserts from the inserts carrier of the inserts cleaning device.

In embodiments, the inserts are mounted at the respective mounting positions on the inserts carrier, so that faces thereof, preferably the inner faces thereof, adjoin the one or more cleaning liquid feed ducts. The pump is operated so that pressurized cleaning liquid is fed to the one or more mounting locations, so that the cleaning liquid is forced via the adjoining face, e.g. inner face, thereof through the permeable body of each insert and exits the permeable body at the other side, e.g. at the surface delimiting the mould cavity.

As preferred the liquid enters the permeable volume via the inner face. This inside out cleaning treatment, e.g. done during one or more phases of the entire cleaning process which could include one or more additional phases wherein other cleaning related treatments are performed, is considered highly effective.

In the method the inserts are detached from the base structure of the movable mould member. So, for example, from the base structure of a drum mould member, or of the base structure of a plate shaped mould member, or of the base structure of a revolving disc shaped mould member, e.g. of installations as discussed above.

In embodiments, the base structure of the movable mould member is kept in place on the installation, e.g. coupled to the respective mould member drive, so as to minimize handling requirements for cleaning. In embodiments, the base structure of the movable mould member is cleaned in-situ, so still on the moulding device to which the base structure belongs. In an alternative approach, the base structure is also detached from the respective moulding device for the purpose of cleaning and/or to switch to another base structure, e.g. embodied to attach thereto different inserts.

In embodiments, a base of the movable mould member is kept coupled to the respective mould member on the moulding device, and the one or more inserts are removed in-situ from this movable mould member and then transported to the remotely arranged inserts cleaning device for the cleaning of the inserts.

In embodiments, the base structure of the movable mould member is made with a closed surface throughout, at least where contact with and/or soiling by food material is to be expected, e.g. a closed surface of non-permeable material, e.g. of an appropriate metal or plastic, so that cleaning is less demanding then of the corresponding inserts. This, for example, allows to clean the base of the movable mould member using a spray cleaning device having one or more spray nozzles from which a jet of cleaning liquid is emitted, for example a handheld spray device.

In embodiments the inserts cleaning device is located remote from the moulding device, e.g. in a separate room of a food production plant.

In embodiments, use is made of a mould member base cleaning device, distinct from the inserts cleaning device, which mould member base cleaning device is used to clean the mould member base structure once the inserts have been detached. As discussed, this could be done in-situ, so with the mould member base still on the moulding device. In an alternative the mould member base cleaning device is located remote from the moulding device, e.g. in a separate room of a food production plant. For example, the mould member base cleaning device uses a spray cleaning device having one or more spray nozzles from which one or more jets of cleaning liquid are emitted, e.g. directed onto exposed surfaces of the mould member base. In case the mould member base includes one or more ejection fluid channels, e.g. as is known for embodiments of mould drums, the mould member base cleaning device may also comprise a cleaning liquid feed arrangement that feeds cleaning liquid to these one or more ejection fluid channels so as to flush the cleaning liquid through these one or more channels and thereby clean the channels. The mould member base cleaning device may, in embodiments, be embodied and operated to spray one or more jets of cleaning liquid onto the mould member base and also, e.g. simultaneously, flush a cleaning liquid through the one or more ejection fluid channels, for example the device having a pump and a feed duct that is, in operation, in communication with the one or more ejection fluid channels of the mould member, e.g. the mould drum. For example, a distributor is provided on the cleaning device or on the mould member, e.g. on a head end of a mould drum, to distribute the cleaning liquid to the one or more ejection fluid channels that are to be flushed clean.

It will be appreciated that as the use of inserts as described herein allows to embody the base structure of the mould member easily cleanable, e.g. absent of any permeable surface structure like the inserts themselves, the cleaning of the base structure of the mould member can be done relatively fast and easily compared to the more demanding cleaning efforts for the inserts.

In embodiments, it is envisaged that initially, e.g. after stopping production of the food products, the entire movable mould member is removed from the moulding device. Then, e.g. at a remote location, e.g. in a separate room, the inserts are detached from the base structure of the mould member for the cleaning process. This, for example, allows to continue production using the moulding device in combination with another movable mould member, e.g. provided with cavities of a different shape in order to produce different food products, e.g. said mould member also having detachable inserts as discussed herein.

In embodiments, a base of the mould member that has been undone from its first soiled set of inserts is already provided with a clean second set of inserts thereon, whilst the previously detached first set of inserts is being cleaned. It is envisaged that, given the cleanability of a base structure of the mould member that has been undone from its inserts, the same base is already provided with a clean set of inserts thereon, whilst the previously detached set of inserts is still being cleaned. This allows for enhanced operational efficiency, for example in case the mould member base with the new set of inserts thereon needs to be mounted back onto the moulding device.

It is noted that in practical embodiments the cleaning process of an insert as discussed herein may take one or more hours, e.g. between two and five hours, e.g. involving different phases wherein the insert is subjected to different cleaning related treatments involving different cleaning liquids, e.g. fresh cold water, a heated liquid, e.g. heated water, one or more liquids, e.g. water based liquids, having properties such as for example acidic properties, descaling properties, bacteriostatic properties, bactericidal properties, e.g. water mixed with one or more agents to create certain properties of the cleaning liquid, etc.

In embodiments, use is made of one or more, preferably multiple, exchangeable inserts carriers, wherein each exchangeable inserts carrier is connectable to a main structure of the inserts cleaning device, which main structure comprises the cleaning liquid pump, at least a portion of the liquid feed duct, the recirculation assembly, and the filter device.

In a preferred embodiment the inserts carrier is an exchangeable inserts carrier that is connectable to a main structure of the inserts cleaning device. The main structure, for example, comprises a housing, e.g. a wheeled housing. The main structure, preferably, accommodates the pump, at least a portion of the liquid feed duct, the cleaning liquid recirculation assembly, and the filter device.

It is noted that the filter device may comprise several filters, e.g. a coarse filter and one or more finer filters, and/or filters based on different filtering techniques, e.g. a coarse filter embodied as a planar filtering plate, and a finer filter embodied with one or more candle filters.

It is noted that, in embodiments, the filter device may be used selectively during one or more phases of the entire cleaning process. So during some phases filtering may not be performed, e.g. when the cleaning liquid is not circulated and is discharged, e.g. in view of replenishing the liquid with new or another liquid.

In an embodiment the installation comprises multiple exchangeable inserts carriers that are each connectable to the main structure of the inserts cleaning device. For example, one or more of the exchangeable inserts carriers may be mounted on the inserts cleaning device as the inserts carried thereby are being cleaned, whilst one or more further exchangeable inserts carriers are present in the installation, e.g. at the same time carrying inserts that still need to be cleaned and/or inserts that have already been cleaned yet have not been mounted back onto the respective mould member base, and/or some exchangeable inserts carriers being empty at said moment.

In an embodiment use is made of an installation comprising multiple moulding devices, each having a movable mould member from which food product moulding inserts can be temporarily detached for cleaning, which installation further comprises a lower number of insert cleaning devices than the number of such moulding devices, e.g. just one or two inserts cleaning devices. For example, the second inserts cleaning device primarily serves to create redundancy as cleaning of such inserts is highly relevant in view of production continuity. In this setting with more moulding devices than inserts cleaning devices the use of exchangeable inserts carriers is highly advantageous. A particular advantage is achieved when all exchangeable inserts carriers of the installation have a common interface with the main structure of the one or more inserts cleaning devices. This allows for an operation wherein each exchangeable inserts carrier can be mounted to each of the one or more inserts cleaning devices of the installation. For example, the interface merely comprises a mechanical coupling to the main structure of the inserts cleaning device, which coupling may also comprise the fluidic connection between the inserts carrier and the liquid duct arrangement of the main structure of the cleaning device. As will be discussed below the interface may also be more extensive, e.g. in view of the presence of a valve arrangement and/or of one or more sensors, etc., on the inserts carrier.

In an embodiment the main structure of the inserts cleaning device is configured to receive multiple inserts carriers simultaneously, e.g. side by side or stacked wherein one inserts carrier is stacked on one or more other inserts carriers. In another embodiment the main structure of the inserts cleaning device is configured to receive just one inserts carrier at a time.

For example, an installation is used that comprises both a drum moulding device as well as a turret type moulding device, e.g. in conjunction with one inserts cleaning device that serves to clean both the inserts that have been temporarily detached from the mould member base of the drum moulding device and the inserts that have been temporarily detached from the mould member base of the turret type moulding device. It will be appreciated that such arrangement allows for reduced financial investments.

It is noted that in embodiments the food production installation may further comprise one or more devices configured for foodstuff mass preparation, e.g. a meat grinder, a mixer to mix the mass with one or more ingredients. The mass may be stored, e.g. in wheeled bins, e.g. in a freezer or cooling facility. The installation comprises one or more of the moulding devices as discussed herein. Based upon customer demand the appropriate moulding device is then selected, and provided with the correct combination of mould member base structure and inserts, and then operated to mould the food products. The products are then, for example, conveyed onwards by a discharge conveyor. The installation may further comprise a batter application device, a coater device (e.g. to coat the food products with a crumb layer), a deep fryer device, an oven, a freezer, and/or a packaging device. Depending on the customer demand the moulded food product is further handled by one or more of these downstream devices, as is known in the art.

In an embodiment the inserts that have been temporarily detached from the associated mould member are mounted on one or more exchangeable inserts carriers at a location remote from the main structure of the inserts cleaning device. Then these one or more loaded inserts carriers are transported to the main structure of the inserts cleaning device and connected to main structure of the inserts cleaning device. As will be explained herein, use may be made of one or more carts, e.g. dedicated carts, to transport the inserts carriers, e.g. the cart having one or more support structures to support thereon one or more inserts carriers.

In an embodiment the inserts cleaning device has a common feed duct and multiple branch ducts that are connected to said common feed duct and that each extend to a respective mounting position for one or more inserts on the inserts carrier. The common feed duct is supplied with cleaning liquid by means of a pump.

In a preferred embodiment each inserts carrier, preferably each exchangeable inserts carrier, is provided with multiple branch ducts, each leading to a corresponding mounting position of the inserts carrier where one or more, preferably just one, insert is to be mounted. In a practical embodiment an exchangeable inserts carrier of this configuration has a feed duct connector assembly that is configured to releasably couple to the feed duct of the main structure of the inserts cleaning device, e.g. via a quick-connector. The feed duct connector assembly may also comprise a further portion of the feed duct, and/or a distribution manifold where the branch ducts start.

In a preferred embodiment, a valve arrangement, e.g. including one or more valves, e.g. one or more electrically controllable valves, is provided to control the flow of cleaning liquid through each branch duct and/or to each mounting position of the inserts carrier. For example, a valve of this valve arrangement is located in each branch duct, or a valve arrangement is mounted at the end of the feed duct and connects to the distinct branch ducts.

For example, a capability of the valve arrangement to control liquid flow to each mounting position on the inserts carrier individually allows vary the duration of the cleaning process amongst the mounting positions. For example, it has been observed that in a mould drum having mould cavities arranged in lanes along the length of the drum, some mould cavities exhibit a more intense soiling than other cavities. The valve arrangement may be used to stop cleaning at a mounting position of the inserts carrier once it has been determined that the one or more inserts at said position are sufficiently clean, e.g. through a measurement, e.g. an automated measurement, based on pressure and/or flowrate of the flow through the one or more inserts. At the same time the cleaning of one or more inserts can continue at mounting position(s) where further cleaning of the inserts is required for as long as needed. So, the valve arrangement may, in embodiments, be used to stop cleaning at a mounting position once the one or more inserts at said position are monitored to be sufficiently cleaned.

Preferably, during one or more phases of the cleaning of the inserts, one or more branch ducts of an insert carrier are closed whilst at the same time one or more other branch ducts connected to the same common feed duct are open, for example wherein during said one or more phases all branch ducts except for one branch duct are closed, for example wherein the valve arrangement is operated to sequentially open one branch duct after another branch duct, whilst closing or keeping closed all other branch ducts.

In an embodiment, an exchangeable inserts carrier has a coupler to connect to the duct arrangement of the main structure of the inserts cleaning device, e.g. a quick-connector, and has multiple branch ducts that each extend to a respective mounting position for one or more inserts on the inserts carrier. Preferably, the inserts carrier is provided with a valve arrangement configured to control the flow of cleaning liquid through each branch duct individually, e.g. a valve for each branch duct of the inserts carrier. In an embodiment the valve arrangement comprises one or more electrically controlled valves. For example the inserts carrier has one or more electrical cables with one or more connectors, allowing to connect the one or more cables to a corresponding electrical circuit of the main structure of the inserts cleaning device in order to control the one or more valves of the valve arrangement and/or to connected one or more other electrical components on the inserts carrier to circuitry of the main structure of the inserts cleaning device, e.g. like one or more pressure sensors, and/or one or more flowrate sensors, and/or one or more temperature sensors, of the inserts carrier, e.g. as discussed herein.

The provision of branch ducts connected to a common feed duct as well as a valve arrangement allows for a variety of advantageous approaches to perform the inventive cleaning method.

For example, during one or more phases of the cleaning of the inserts, one or more branch ducts of an insert carrier are closed whilst at the same time one or more other branch ducts connected to the same common feed duct are open, for example wherein during said one or more phases all branch ducts except for one branch duct are closed, for example wherein the valve arrangement is operated to sequentially open one branch duct after another branch duct, whilst closing or keeping closed all other branch ducts.

For example, one or more branch ducts can be closed whilst at the same time one or more other branch ducts connected to the same common feed duct are open. This allows, for example, to pass the entire output of the pump to a selected group of one or more inserts, e.g. allowing for a strong cleaning flow through said one or more inserts.

It is also, for example, possible to close all branch ducts except for one branch duct, so as to pass the entire pump capacity to said one branch duct and thus to the one or more, preferably just one, insert adjoining said one open branch duct.

For example, as will be explained below, the arrangement may allow to monitor one or more parameters related to the flow through said one open branch duct, which will allow to determine, for example, the progress of the cleaning of the one or more inserts, preferably just one insert, related to said one open branch duct.

One can envisage an embodiment wherein the valve arrangement is operated to sequentially open one branch duct after another branch duct, whilst closing or keeping closed all other branch ducts. This approach may allow to monitor the flow through the common duct, e.g. only through the common feed duct, as that will provide relevant information for the one or more inserts associated with the one open branch duct.

For example, the monitoring of cleaning liquid flow involves monitoring the pressure and/or the flow rate of the flow of cleaning liquid, e.g. through the common feed duct and/or through one or more branch ducts, and/or monitoring pressure at the one or more mounting positions of the inserts carrier. One may also, or alternatively, monitor power consumption of the liquid pump feeding the cleaning liquid into the feed duct, e.g. into the common feed duct, for example the pump being an electrically driven pump.

In an embodiment the pump is a variable flow pump, e.g. having an electric motor with variable speed.

In an embodiment the pump is a piston pump, e.g. a swash plate piston pump.

In an embodiment the inserts cleaning device has a common feed duct and multiple branch ducts that are connected to said common feed duct and that each extend to a respective mounting position, wherein each mounting position is embodied to receive just one insert, so that a flow of liquid through one branch duct reaches just one insert. For example, as preferred, a valve arrangement is provided that allows to selectively open and close each branch duct. For example, a valve, e.g. a ball valve, is associated with each branch duct, e.g. the valve being controlled electrically, e.g. by means of a controller of the valve arrangement, e.g. a computerized controller. This design allows for advantageous approaches for cleaning the inserts. For example, as discussed above, one can now pass all of the output of the pump to just one insert, e.g. in view of creating—during one or more phases of a cleaning cycle—a maximized flow of cleaning liquid through the one insert as all other branches are then closed. One can now also monitor the one active flow of liquid, and derive from said monitoring the progress of the cleaning of the insert.

For example, the inserts cleaning device may have a computerized controller that is linked to the valve arrangement, e.g. to perform a preprogrammed routine including opening and closing of one or more valves, e.g. the routine being selected from a set of preprogrammed routines. For example, the computerized controller has a memory wherein for multiple distinct inserts and/or multiple distinct inserts carriers respective preprogrammed cleaning routines are stored.

For example, each insert and/or each inserts carrier is provided with a respective identifier, e.g. an optically readable code, an RFID tag, etc. allow to identify the insert(s) and/or the inserts carrier(s) of the installation. The identifier is preferably unique for each component, e.g. for each insert, e.g. allowing for the logging of the cleaning and/or the use of each insert and/or inserts carrier over time. The provision of identifiers may also be used to select in an automated manner the appropriate cleaning routine that is then executed by the inserts cleaning device, e.g. steered by the associated computerized controller.

For example, the inserts carrier and/or the inserts cleaning device is provided with a reader, e.g. a near field reader, that is configured to read the identifier on the insert and/or on the inserts carrier.

For example, the inserts cleaning device, and/or the inserts carrier, is/are provided with one or more sensors that measure the flow and/or pressure of the cleaning liquid. For example, one or more flowrate sensors are provided that measure a flow that is representative for the flow through the one or more permeable bodies during cleaning, e.g. said measurement(s) being used to determine the progress of the cleaning process and/or the remaining degree of soiling of the permeable body during the cleaning process.

For example, in an embodiment, the inserts cleaning device and/or the inserts carrier, is/are provided with one or more temperature sensors that measure the temperature of the cleaning liquid. For example, one or more temperature sensors are mounted on the inserts carrier, e.g. in proximity to each of the mounting positions thereof, e.g. allowing to measure the temperature to which each insert at said mounting position is exposed. This may be of relevance in view of, if desired, avoiding thermal shocks and/or overheating of the inserts. For example in conjunction with inserts that comprise a permeable volume made at least in part of a plastic material, e.g. made using a 3D printing technique, the provision of one or more temperature sensors on the inserts carrier may be advantageous. For example, one can envisage the monitoring, possibly even logging, of the actual temperature to which an insert is subjected during the cleaning process. The measurement of temperature may be done for each mounting position separately, e.g. of advantage in embodiments wherein the flow of cleaning liquid to each mounting position can be controlled individually, and even more in embodiments wherein inserts on the same inserts carrier may be exposed to different liquids, e.g. of different temperatures, at the same time.

In embodiments the inserts are mounted in the inserts carrier so as to be directed with their outer faces downward or at a downward inclination during the cleaning process, e.g. with the collector device at a distance underneath the inserts. This, for example, may avoid residual soiling matter remaining behind on the inserts, e.g. in the cavity or cavities thereof.

In embodiments the inserts carrier comprises at the mounting positions thereof one or more sealing members that are configured to sealingly engage the one or more inserts mounted at their respective mounting positions. The sealing members avoid that cleaning liquid bypasses the permeable volume of the insert(s), which could lead to reduced cleaning efficiency and/or may impair any monitoring of the pressure and/or flow of liquid and deriving information about the insert(s) that is/are cleaned on the basis of said monitoring. For example, each sealing member is made of compressible resilient material, e.g. an elastomer or of a deflectable metallic member, e.g. a metallic sealing member in view of exposure to aggressive cleaning liquid(s). In another embodiment, or in combination herewith, each insert is provided with one or more sealing members that cooperate in a sealing manner with both the base of the mould member and with the inserts carrier when mounted thereon. In an embodiment the base of the mould member and/or he inserts carrier are devoid of any sealing member that sealing interacts with the insert(s), with one or more sealing members, e.g. compressible and/or deflectable, being mounted on, or integrated with, the insert.

For example, an insert is provided with at least one readily removable sealing member, e.g. an elastomeric sealing ring, wherein prior to mounting the insert on the inserts carrier this at least one sealing member is removed. For example, the removed sealing member is cleaned separate from the insert, e.g. in an ultrasonic bath, and placed back onto the insert after both have been cleaned.

In an embodiment the inserts carrier comprises or is associated with one or more clamping assemblies that are adapted to releasably clamp the inserts onto the mounting positions of the inserts carrier. The clamping assemblies may provide a resilient clamping of the insert(s), e.g. in view of compensation for dimensional changes of the inserts during the cleaning process, e.g. variation in thickness and/or diameter, e.g. as the inserts may be made of plastic that exhibits a significant dimensional change, e.g. when heated to over 60 degrees Celsius and later cooled due to flushing with cold water. For example, a clamping assembly comprises a resilient member mounted between a rigid part of the clamping assembly and the insert to allow for dimensional changes of the insert during cleaning. One could also provide for a force controlled, e.g. pneumatic, actuation of a clamping member that engages the insert so that the insert is not unduly strained when mounted at the mounting position.

In an embodiment each insert has a circular periphery and each clamping member comprises or is formed by a ring that can be arranged about the insert. For example, the ring is embodied to be secured on the inserts carrier, e.g. the mounting location of the inserts carrier having a threaded portion and the ring having a mating threaded portion.

In an embodiment the inserts carrier has at each mounting position thereof a chamber that is open at one side, wherein the inserts carrier is embodied to mount a one or more inserts, e.g. a single insert, thereon such that the inner or the outer face(s) thereof cover said open side of the chamber and the chamber is sealed at said one side. Preferably, the inserts and the mounting positions on the inserts carrier are configured so that the inner face(s) of the insert(s) cover(s) said open side of the chamber and such that the chamber is sealed at said one side. This allows to force the cleaning liquid from the chamber through the permeable volume from the inside outwards, which appears effective for dislodging foodstuff matter from the permeable volume and/or the face of the one or more mould cavities of the insert.

The feed duct, e.g. the branch duct associated with mounting position, is in communication with the chamber, so that liquid fed to said chamber is forced through the permeable body of the insert(s) at said mounting position.

For example, the inserts carrier has multiple chambers with their open sides in a common plane.

For example, the inserts carrier has four, five, six, seven, eight, or more chambers.

Preferably, at least 75% of portion of the inner face that is permeable for liquid is unhindered exposed to the liquid in a chamber of the inserts carrier, allowing for relatively unhindered entry of liquid into the permeable volume of each insert via the inner face thereof.

In an embodiment the inserts cleaning device is configured and operated to move the inserts carrier or carriers (exchangeable) mounted thereon during one or more phases of the cleaning process, e.g. in a rotation about a horizontal axis, e.g. about an axis that is perpendicular to a plane of the inserts carrier wherein multiple chambers thereof have their respective open side covered by one or more, preferably just one, inserts to be cleaned.

In embodiments the inserts cleaning device further comprises one or more spray devices, each spray device being configured and operated to spray cleaning liquid, e.g. at least onto the outer face of the inserts mounted on the inserts carrier. In an embodiment, one or more spray devices each comprise one or more mobile spray nozzles that are moved relative to the inserts during the cleaning, e.g. the inserts carrier remaining stationary and the one or more spray nozzles being in motion. For example, the one or more spray devices are operated simultaneous with cleaning of the inserts by cleaning liquid fed by the pump as discussed herein during one or more phases of the cleaning process. For example, one or more spray devices have spray nozzles directing jets onto the outer faces of the inserts carried by the inserts carrier. The provision of one or more spray devices is in particular envisaged for embodiments wherein the inserts are held on the inserts carrier such that one face of the inserts, preferably the inner face, is directed towards the chamber(s) of the inserts carrier whereas the other face, e.g. the outer face of the inserts, is freely exposed, so that the one or more spray devices can be configured to spray at least onto said exposed face of the inserts.

In an embodiment it is envisaged that as part of the inventive inserts cleaning device and method use is made of one or more housings that are placed against the side of the inserts that faces away from the chamber(s) of the inserts carrier, these one or more chambers now being called first chambers, the one or more housings also extending over the one or more mould cavities of the inserts, so as to form together with the inserts one or more second chambers, each second chamber being located opposite a corresponding first chamber with the one or more inserts at said mounting position being in between said first and second chambers. So, effectively, at each mounting position of the inserts carrier one or more inserts are then arranged between the first chamber and the second chamber. Herein the first chamber is connected to the liquid feed duct of the cleaning device during the cleaning process, e.g. as described in various embodiments herein.

The one or more housings may be part of the main structure of the inserts cleaning device. For example, the housings and any inserts carrier mounted on the inserts cleaning device are movable relative to each other, e.g. towards and away from one another, to arrange the inserts held by the inserts carrier(s) so that the mentioned first and second chambers are established.

In another embodiment, the one or more housings are integrated with the (exchangeable) inserts carrier.

The housing may, in a simple embodiment, be part of the collector device so that liquid emerging through the permeable volume from the first chamber is collected in the second chamber. The housing then has, for each second chamber, a discharge port in communication with the recirculation assembly, or via a valve arrangement with multiple recirculation assemblies when present in the insert cleaning device. This arrangement, for example, allows for reduction of spillage of cleaning liquid. In an embodiment, this arrangement may be used to perform a cleaning process wherein a first cleaning liquid is forced through a first insert held on an inserts carrier, the first cleaning liquid being collected in a respective second chamber and recirculated via a first recirculation assembly, whilst a second cleaning liquid, differing from the first cleaning liquid, is forced through a second insert held on the inserts carrier. This second liquid is then collected in another second chamber and recirculated via a second recirculation assembly.

The provision of the one or more housings that establish one or more second chambers with the one or more inserts may also be used, during the cleaning process, to establish a flow of cleaning liquid from the second chamber, through the permeable volume of the one or more inserts, into the first chamber. This entails that the one or more housings have a second chamber port that is, or can be brought, in fluid communication with a cleaning liquid feed duct to which cleaning liquid is fed by a pump. It also entails that the liquid which now enters the first chamber via the permeable volume of the inserts can be discharged, e.g. to the recirculation system of the cleaning device. For example, each inserts carrier has a discharge valve that can be opened to cause discharge of soiled cleaning liquid from the one or more first chambers thereof. In embodiments, a cleaning method comprises a phase wherein cleaning liquid is forced in one direction through the permeable volume and in another phase cleaning liquid is forced in the opposite direction through the permeable volume. This variation can be done once, but if desired also many times during a cleaning process of one or more inserts.

In an embodiment the inserts carrier has one or more pressure sensors configured to measure the pressure of cleaning liquid at each mounting position, e.g. in each chamber, of the inserts carrier, e.g. at selected moments during the cleaning process to which the one or more inserts is/are subjected in the inserts cleaning device. For example, said liquid pressure is measured at the start of the cleaning by forcing liquid through the one or more inserts mounted at the mounting position, e.g. in communication with the chamber, and said pressure is measured at one or more moments later on, e.g. at regular time intervals, e.g. allowing to monitor the progress of the cleaning process for the one or more inserts. For example, such measurement of pressures is done in conjunction with a known flowrate of the cleaning liquid through the one or more inserts mounted in communication with mounting position, e.g. the chamber, e.g. as the pump provides a constant and/or a known flowrate of the cleaning liquid.

Another possibility afforded by measuring pressure and/or flowrate at each mounting position is the ability to detect whether a problem exists with the mounting of the insert. For example, when a sealing member is employed to seal between the insert and the carrier any failure or absence of such a sealing member can be detected, e.g. as flow rate is unduly large compared to other mounting positions. The same measurement could also detect whether clamping of the insert has been done properly, which could also lead to undesired leakage of cleaning liquid at the mounting position. This approach may serve to avoid incomplete or unsatisfactory cleaning of the insert(s), e.g. an alarm being issued when the controller linked to the one or more sensors detects the presence of such leakage. The present invention also relates to a method wherein said measurement(s) is/are used for the detection of problems relating to the mounting of the inserts.

In an embodiment the inserts carrier has one or more flowrate sensors configured to measure the flowrate of cleaning liquid to each mounting position, e.g. each open sided chamber thereof. It will be appreciated that the inserts carrier may have one or more pressure sensors configured to measure the pressure of cleaning liquid at each mounting position and have one or more flowrate sensors configured to measure the flowrate of cleaning liquid to each mounting position.

The provision of the one or more housings as discussed herein, which provision establishes one or more second chambers with the one or more inserts, may also be used during the cleaning process in the course of monitoring cleaning liquid pressure and/or cleaning liquid flow. For example, in embodiment, one could provide pressure sensors to measure both the pressure in the first chamber and in the second chamber to determine the pressure drop over the one or more inserts. This pressure drop measurement may be indicative of the progress of the cleaning process and may be used as input for a controller of the cleaning device.

The cleaning fluid may comprise a liquid, e.g. water, containing a detergent, which can be any type of suitable detergent adapted to remove food material remnants. To remove calcium, an acidic liquid may be applied. It is also conceivable that the cleaning fluid is, during one or more phases of the cleaning process, pure water. In embodiments, it is conceivable that during one or more phases a gas is forced through the inserts that are being cleaned, e.g. carbondioxide gas, ozone, Sulphur dioxide, etc. etc.

In an embodiment, a gas is added to the cleaning liquid, e.g. ozone, in order to obtain for example to obtain a bactericidal effect.

In an embodiment the cleaning liquid, e.g. during recirculation, is subjected to a treatment with a bactericidal light, e.g. UV-light.

In embodiments, a heater element and possibly also a temperature sensor is provided in the cleaning liquid circuit. Thus, a heated liquid or heated gas is allowed to flow through the permeable volume.

Advantageously, the cleaning liquid circuit of the inserts cleaning device further comprises a tank, which may be atmospheric or pressurized, in order to have a buffer of cleaning liquid for example, e.g. as part of the recirculation assembly.

Possibly, the cleaning liquid circuit is provided with a pressure valve which is connected to a control device, such that the pressure of the pressurized cleaning liquid is controllable, e.g. downstream of the pump or the valve being integrated with the pump.

In embodiments, a pressure sensor is provided to determine the pressure in the second chamber when present opposite a first chamber as discussed herein. Advantageously, the pressure sensor is connectable to a controller of the inserts cleaning device. In embodiments, the pressure of the pressurized cleaning liquid stream is controllable on the basis of input from this pressure sensor, and/or on the basis of a determination of pressure drop over the insert(s). For example, when the permeable volume is clogged, the pressure in the first chamber may be relatively high. The pressure valve may consequently be set to increase the pressure of the pressurized cleaning liquid.

In an embodiment the inserts carrier is provided with battery storing electrical energy, the battery being connected to one or more electric components on the inserts carrier, e.g. the one or more valves, and/or one or more pressure sensors, and/or one or more flowrate sensors. This allows to avoid electrical cables and/or connectors between the inserts carrier and the main structure of the inserts cleaning device. In a preferred embodiment the inserts carrier is an exchangeable inserts carrier as discussed herein.

In an embodiment, the inserts cleaning device is configured for wireless communication between one or more components on the inserts carrier on the one hand and associated circuitry on the main structure of the cleaning device on the other hand. For example, in an embodiment, the one or more valves of the inserts carrier communicate wireless with a related controller in the main structure of the cleaning device. For example, in an embodiment, the one or more pressure sensors and/or the one or more flowrate sensors communicate wireless with a related controller in the main structure of the cleaning device.

In an embodiment each exchangeable inserts carrier, e.g. provided with a battery, is provided with a wireless communication circuit that is linked to one or more components of the inserts carrier and is configured to provide communication with an external system, e.g. on the main structure of the inserts cleaning device, an overall data system related to the food production installation, and/or a hand held device, for example a smartphone, e.g. held by an operator in the food production process. The communication could be mono-directional or bi-directional. For example, the wireless communication circuit on the inserts carrier is linked, e.g. through wiring and/or wireless, to, for example one or more valves, and/or one or more sensors, and/or electronic identifier, e.g. as discussed herein. For example, wireless communication is based on Bluetooth, ZigBee, etc.

In an embodiment, the wireless communication circuit of an exchangeable inserts carrier is used to exchange data with a handheld device, e.g. a smartphone running a computer program, e.g. an app, e.g. the handheld device being held by an operator. This for example, may be used to allow an operator to perform one or more tasks such as identification of the inserts carrier, operational status of the battery of the inserts carrier, operational status of any valves and/or sensors of the inserts carrier, suitability of the inserts carrier for certain inserts to be mounted thereon, etc.

In an embodiment the main structure of the inserts cleaning device is provided with a wireless communication circuit configured to establish wireless communication with the one or more inserts carriers of the installation, e.g. near field wireless communication when the one or more inserts carriers are close to, or even installed on, the main structure of the inserts cleaning device.

In an embodiment, the installation comprises a controller, e.g. a computerized controller, that is linked to the one or more pressure sensors that detect a pressure representative of actual flow through one or more inserts. This controller may be configured to determine at one or more moments during the entire cleaning process, e.g. at regular time intervals, the pressure of the cleaning liquid supplied to each mounting position on the basis of the signals provided by the one or more pressure sensors. For example, a relatively high pressure may be regarded as being representative of a soiled insert(s) that requires further cleaning and a relatively low pressure may be regarded as being representative of a clean insert. For example, the controller is configured to continue feeding cleaning liquid to a mounting location until the pressure sensor signals a pressure corresponding to a preset pressure level representative of the insert being properly cleaned.

In an embodiment the inserts cleaning device has one or more first cleaning liquid feed ducts, e.g. with branch ducts as discussed herein, and one or more second cleaning liquid feed ducts, e.g. with branch ducts as discussed herein, each of the first and second feed ducts leading to the one or more mounting positions, and a first pump and a second pump, connected respectively to the first and second liquid feed ducts. This arrangement generally may allow for an operation method wherein the first pump is used to feed a first cleaning liquid to the one or more mounting positions and wherein the second pump is used to feed a second cleaning liquid to the one or more mounting positions, wherein the first and second liquids differ from one another in at least one property thereof, such as pressure, flow rate, temperature, composition. In an embodiment, during a phase of the cleaning process, only the first liquid is fed to the one or more mounting positions and during another phase of the cleaning process only the second liquid is fed to the one or more mounting positions. For example, the first liquid is plain or pure water, e.g. heated water or cold water, and the second cleaning liquid is water mixed with one or more cleaning agents, e.g. acidic agent(s), bacteriostatic agent(s), etc. In another embodiment both the first and second cleaning liquid are water based cleaning agents, e.g. of different pH levels.

In an embodiment the inserts cleaning device has a first collector system including a collector device as well as a second collector system including a collector device, each of these systems being operated to collect a respective first cleaning liquid and second cleaning liquid that is forced through the permeable volume of one or more inserts. This, for instance, allows to recirculate each of the first and second cleaning liquids without these liquids becoming mixed in the recirculation process.

In an embodiment the inserts cleaning device is provided with a pressurized gas system, e.g. pressurized air, that is configured to supply pressurized gas to the one or more mounting positions of the one or more inserts carriers during the cleaning process, e.g. during one or more phases thereof. For example, in an embodiment, first a pressurized gas, e.g. air, is forced through the one or more inserts mounted on an inserts carrier, e.g. ahead of forcing liquid through the permeable volume of the one or more inserts. For example, the gas is cold, e.g. even causing freezing of any soiling matter in or on the inserts. For example, a gas is blown through the permeable volume during multiple phases of the cleaning process. For example, a gas is blown through the permeable volume in a final phase of the cleaning process, e.g. to expel liquid from the permeable volume and/or to dry the permeable volume. For example, the main structure of the insert cleaning device is provided with a pressurized gas source, e.g. an air compressor, possibly with a buffer tank for compressed air. An inserts carrier may be provided, in addition to a ducting arrangement for one or more liquids, e.g. as discussed herein, also with a dedicated gas ducting arrangement and possibly valve arrangement for the gas that is to be blown through the one or more inserts mounted on the inserts carrier.

In embodiments the inserts, cleaning device comprises a drying assembly, e.g. a hot air drying assembly, that is configured to dry the one or more inserts after completion of the cleaning process. The drying assembly may comprise a hot air blower, an infrared heater, etc.

In an embodiment the installation comprises multiple exchangeable inserts carriers that are detachable from the main structure of the inserts cleaning device, wherein the method comprises mounting inserts that have been removed from a mould member base of a moulding device on the inserts carrier whilst said inserts carrier is detached from the inserts cleaning device, e.g. at a location remote from the inserts cleaning device, e.g. this activity being done in proximity of the respective moulding device. The method then is continued by attaching the inserts carrier with the inserts mounted thereon to the cleaning device, e.g. with transportation using a cart in between.

In an embodiment the installation comprises multiple exchangeable inserts carriers that are detachable from the main structure of the inserts cleaning device, wherein the method comprises having one or more of said inserts carriers detached from the cleaning device in order to mount inserts thereon at a remote location, and having simultaneously one or more inserts carriers attached to the inserts cleaning device so as to clean the inserts carried thereby.

In an embodiment, the installation comprises multiple exchangeable inserts carriers that are detachable from the main structure of the inserts cleaning device, as well as one or more carts that are each configured to transport one or more inserts carriers between the inserts cleaning device and a remote location. The same carts can also be used for storage of non-used inserts carriers, e.g. even with inserts mounted thereon, in a storage facility, e.g. a cleanroom. The carts may be wheeled carts that are manually displaceable within a food products facility. The use of carts facilitates handling efforts by operators and may also avoid damage to the inserts.

In an embodiment the inserts cleaning device has one or more heaters configured to heat the one or more cleaning liquids, e.g. to temperatures between 60 and 95 degrees Celsius. In an embodiment, it is envisaged that the inserts cleaning device lacks any heaters and is connected to a source of heat, e.g. steam and/or hot water, e.g. already present in the food production facility for other purposes.

In an embodiment, the inserts cleaning device has one or more mixer devices that are configured to mix one or more cleaning agents with water to form one or more cleaning liquids.

Preferably, the outer face of each insert is fluid tight so that during production of the food product there is no bypassing of ejection fluid past the mould cavity or cavities of the insert. Techniques to create a fluid tight outer face on an insert are known in the art.

The shape of the product which is to be moulded is in embodiments that of a disc to mould a circular product, e.g. a meat patty, e.g. hamburgers. Nuggets, e.g. of poultry based starting material, are formed in rather small cavities, e.g. of a more or less rectangular shape. Alternatively inserts having one or more cavities of more irregular shape are known, e.g. to mould products having an irregular circumference and/or an irregular thickness. The products may also be elongated, e.g. like chicken fillets, sausage like products, etc. The mould cavities have an opening in the outer surface for the introduction of foodstuff mass into the mould cavity, and for ejection of the moulded product.

Examples of the products to be moulded with the moulding device and inserts are hamburgers, nuggets, schnitzels, tenderloins, steaks, (meat) balls and fillets. An appropriately designed moulding device can handle different foodstuff masses, such as red and white meat, fish, potato and other plant-based foodstuff masses, but also edible fungi-based masses, soy-based masses and edible insect-based masses and the like. Often the mass is ground by a grinder, e.g. ground meat.

In embodiments, both known and in the context of the present invention, the mould cavities are arranged in the outer face of a mould drum in a mould cavities pattern with lanes of cavities. Herein, in a lane, cavities are arranged at multiple longitudinal positions when seen in longitudinal direction, of a mould drum. A lane may be straight, so parallel to a mould drum axis, or helical, as is known in the art.

In embodiments, both known and in the context of the present invention, multiple lanes are provided, e.g. on the mould drum when seen in circumferential direction. In embodiments, the drum surface may comprise 4, 5, 6, 8, 10, 12 or more lanes of cavities, predominantly depending on the size of the products. In a lane multiple cavities are arranged, e.g. 2, 3, 4, 5, 6, 7, 8 or even more. Obviously, the length of the drum and the size of the cavities impacts the number of cavities in a lane. For example, the drum has a length between 50 and 120 centimetres, e.g. 60, 70, or 100 centimetres.

In general it is envisaged that in embodiments the mould cavities of the inserts are shaped so that food products with a thickness between 3 and 40 mm can be produced, in particular between 10 and 30 mm. Product length and/or width, or diameter, may for example vary between 5 and 250 mm, e.g. diameters of between 8 and 15 centimetres, e.g. for hamburger meat patties.

The length of a rotary mould drum in longitudinal direction thereof is in practical embodiments between 400-1100 mm, e.g. about 600 or 700 or 1000 mm.

In embodiments, each mould drum used for forming the food products is provided with multiple detachable inserts. For example, multiple inserts are provided on a base structure of the mould drum, e.g. on a solid, non-permeable, metal base, e.g. by any known releasable fastening technique, e.g. with bolts or screws, in a releasable manner to allow for regular cleaning of the inserts.

In an embodiment, each insert comprises one or more lanes of cavities, each lane extending in a longitudinal direction, e.g. in a straight line, e.g. the insert extending over the length of the mould drum or at least the majority of the mould drum length.

In an embodiment, an insert comprises only a single mould cavity, or two, or three mould cavities, or even more. From the prior art, techniques are known to position or integrate such an insert into the rotary mould drum.

An insert comprises a permeable volume which is permeable for fluid, in particular for ejection fluid that is used for assisting in the ejection of moulded products from the mould cavities. The permeability serves to allow passage of the ejection fluid through the body to cause or assist the ejection of the product. It is preferred that the openings of the permeable volume in the surface of the mould cavity are generally too small for the foodstuff mass to enter significantly into the openings during the production of the food product. As will be appreciate soiling will occur nonetheless, as the food contacts the permeable volume and, for example, any liquid components, e.g. carrying proteins containing matter and/or fatty substances, of the food mass may enter into the permeable volume.

As indicated above, a permeable insert, or the permeable portion of an insert, can be made from a porous material. For example, the permeable volume of the insert comprises a porous sintered metal, such as stainless steel, aluminium, copper, or bronze. It is also conceivable that the permeable volume of the insert comprises one or more polymers. Known sinter powder has a particle size of 100 pm-50μ, which has been sintered. Possible, isostatic pressing and/or coaxial compression is applied to produce an insert having a permeable volume.

The permeable volume may have a porosity between 3-30%, advantageously between 5-15%. The fine openings, or minute openings in practical embodiments, are generally referred to as 'pores' in relation to a porous material permeable volume.

It is also conceivable that the insert, or at least a component that forms the insert together with one or more additional components, is made from a solid, non-porous or closed celled, material, e.g. provided in a machining step with fine passages having fine openings that open out in the cavity, for example micropassages or nanopassages.

Possibly, the insert, or at least an insert component that forms the insert together with one or more additional components, is made using a rapid prototyping technique, e.g. metal 3D printing or polymer 3D printing. Preferably, fine passages of the mould body are formed in the rapid prototyping process, so, as preferred, without requiring a further machining step to form these passages for the ejection fluid. For example, in a 3D printed permeable insert the average diameter, e.g. over the length thereof, of such passages is between 0.05 mm and 0.8 mm, e.g. between 0.05 and 0.3 mm. The distance between adjacent passages may for example be between 1 mm to 5 mm. It is also conceivable that the fine openings are created by perforation of an insert component, e.g. using laser drilling, high pressure jet drilling, or the like.

For example, using a rapid prototyping or 3D technique fine passages are made in the permeable body that taper, so become narrower from an inlet side thereof to the fine opening in the surface of the mould cavity, e.g. over the entire length of the passage or over a portion thereof. This production is preferably done without requiring a further machining step to form these passages for the ejection fluid.

In embodiments a rotary mould drum of the moulding device further comprises at least one ejection fluid inlet associated with a group of mould cavities from which moulded food products are to be ejected simultaneously. In embodiments, one ejection fluid inlet per lane of cavities is provided, preferably at a head end, also called axial end, of the drum. Optionally, ejection fluid inlets common to the same lane are provided at opposed head ends of the drum. In alternative embodiments, for example, one ejection fluid inlet per cavity is provided. It is also conceivable that one or more ejection fluid inlets are provided in the outer drum surface, e.g. in proximity to a head end of the drum.

In embodiments, one or more channels extend from each ejection fluid inlet of a mould member to the one or more permeable volumes of a group of mould cavities. The one or more channels provide communication from the at least one ejection fluid inlet via the channels and via the permeable volumes into the mould cavities to assist in ejection of the moulded products from the group of mould cavities.

In embodiments, one or more inserts have a periphery that is open so as to allow for passage of cleaning liquid via the open periphery through the permeable body to the face of the insert that delimits the one or more cavities therein, e.g. simultaneous with a cleaning liquid being passed via the inner face through the permeable body to the mould cavity face of the insert. In an embodiment the cleaning device is configured so that cleaning liquid fed to a mounting position passes via the open periphery of the insert through the permeable body.

The present invention also relates to an installation for production of food products, e.g. to perform a method as described herein, said installation comprising:

a moulding device for moulding the food products from a pumpable foodstuff mass, the moulding device comprising a movable mould member having food product moulding inserts that are temporarily detachable for cleaning, wherein each food product moulding insert has:

an outer face, one or more recessed mould cavities, each mould cavity defining a shape of the product which is to be moulded, the mould cavities each having an opening in the outer face for the introduction of foodstuff mass into the mould cavity and for the ejection of the moulded product, an inner face, a permeable volume between the inner face and the one or more mould cavities, said permeable volume comprising openings opening out at the one or more mould cavities of the insert, such that each mould cavity of the insert is delimited at least in part by a permeable volume, to allow for, in operation of the moulding device, passing of pressurized ejection fluid from the inner face through the permeable volume to the mould cavity in order to assist release of the food product formed in the mould cavity from the insert, an inserts cleaning device, comprising:

an inserts carrier configured to temporarily mount thereon multiple food product moulding inserts, that have been temporarily detached from the movable mould member, at respective insert mounting positions, one or more cleaning liquid feed ducts, a pump connected to the one or more cleaning liquid feed ducts, the one or more liquid feed ducts leading from the pump to the mounting positions of the inserts carrier, a collector device for collecting cleaning liquid, a cleaning liquid recirculation assembly extending from the collector device to the pump, a filter device arranged in the recirculation assembly.

The inventive installation may have one or more features as discussed herein.

The present invention also relates to a method for production of food products wherein use is made of an installation as described herein. For example, in said method, after stopping production involving the use of a set of food product moulding inserts, e.g. at the end of a production day, the set of inserts is cleaned using the inserts cleaning device. The cleaned inserts may be placed back on a movable mould member in order to continue production of the food products, e.g. on the following production day, or stored for later use. For example, another set of inserts is then installed on the mould member base, e.g. having differently shaped mould cavities to produced different products.

The present invention also relates to an inserts cleaning device configured to clean inserts that have been temporarily detached from a moulding device for moulding food products from a pumpable foodstuff mass, which moulding device comprises a movable mould member having food product moulding inserts that are temporarily detachable for cleaning, wherein each food product moulding insert has:

an outer face, one or more recessed mould cavities, each mould cavity defining a shape of the product which is to be moulded, the mould cavities each having an opening in the outer face for the introduction of foodstuff mass into the mould cavity and for the ejection of the moulded product, an inner face, a permeable volume between the inner face and the one or more mould cavities, said permeable volume comprising openings opening out at the one or more mould cavities of the insert, such that each mould cavity of the insert is delimited at least in part by a permeable volume, to allow for, in operation of the moulding device, passing of pressurized ejection fluid from the inner face through the permeable volume to the mould cavity in order to assist release of the food product formed in the mould cavity from the insert, and wherein the inserts cleaning device comprises:

an inserts carrier configured to temporarily mount thereon multiple food product moulding inserts, that have been temporarily detached from the movable mould member, at respective insert mounting positions, one or more cleaning liquid feed ducts, a pump connected to the one or more cleaning liquid feed ducts, the one or more liquid feed ducts leading from the pump to the mounting positions of the inserts carrier, a collector device for collecting cleaning liquid, a cleaning liquid recirculation assembly extending from the collector device to the pump, a filter device arranged in the recirculation assembly.

The present invention also relates to an inserts carrier configured to temporarily mount thereon at respective insert mounting positions one or more food product moulding inserts that have been temporarily detached from the movable mould member of a moulding device configured for moulding food products from a pumpable foodstuff mass, which inserts carrier is embodied to be connected, permanently or exchangeable, to a main structure of an inserts cleaning device, said main structure comprising:

one or more cleaning liquid feed ducts, a pump connected to the one or more cleaning liquid feed ducts, the one or more liquid feed ducts being configured to connect the pump to the mounting positions of the inserts carrier when connected to the main structure, a collector device for collecting cleaning liquid, a cleaning liquid recirculation assembly extending from the collector device to the pump, a filter device arranged in the recirculation assembly.

The present invention also relates to a combination of an inserts cleaning device for cleaning food product moulding inserts that have been temporarily detached from the movable mould member of a moulding device configured for moulding food products from a pumpable foodstuff mass, which insert cleaning device has a main structure comprising:

one or more cleaning liquid feed ducts, a pump connected to the one or more cleaning liquid feed ducts, the one or more liquid feed ducts being configured to connect the pump to the mounting positions of the inserts carrier when connected to the main structure, optionally, a collector device for collecting cleaning liquid, optionally, a cleaning liquid recirculation assembly extending from the collector device to the pump, optionally, a filter device arranged in the recirculation assembly, the combination further comprising:

multiple exchangeable inserts carriers, each of said carriers being configured to temporarily mount thereon multiple food product moulding inserts, that have been temporarily detached from the movable mould member, at respective insert mounting positions, wherein each of said exchangeable inserts carriers is exchangeable connectable to the main structure of the inserts cleaning device.

The present invention also relates to a method for cleaning food product moulding inserts that have been temporarily detached from a movable mould member of a moulding device that is configured for moulding food products from a pumpable foodstuff mass, wherein each food product moulding insert has:

an outer face, one or more recessed mould cavities, each mould cavity defining a shape of the product, which is to be moulded, the mould cavities each having an opening in the outer face for the introduction of foodstuff mass into the mould cavity and for the ejection of the moulded product, an inner face, a permeable volume between the inner face and the one or more mould cavities, said permeable volume comprising openings opening out at the one or more mould cavities of the insert, such that each mould cavity of the insert is delimited at least in part by a permeable volume, to allow for, in operation of the moulding device, passing of pressurized ejection fluid from the inner face through the permeable volume to the mould cavity in order to assist release of the food product formed in the mould cavity from the insert, wherein, in the method, use is made of an inserts cleaning device, which inserts cleaning device comprises a first component, e.g. an inserts carrier as described herein, that delimits a first chamber having an opening, and a second component, e.g. a housing as described herein, that delimits a second chamber having an opening, wherein the insert to be cleaned is placed at least with its permeable volume between the first and second chambers, so that the first and second chambers are opposite one another, and wherein at least the first chamber is connected to a cleaning liquid feed duct, and wherein the method comprises feeding cleaning liquid by a pump via the cleaning liquid feed duct to the first chamber, which cleaning liquid passes via the opening of the first chamber into and through the permeable volume of the insert and exits the permeable volume to arrive via the opening thereof in the second chamber, the cleaning liquid being discharged from the second chamber, e.g. recirculated via a recirculation assembly as described herein.

In an embodiment, the first component is formed by an inserts carrier as described herein. For example herein, the second component is formed by one or more housings that are configured to be placed against the side of the inserts that faces away from one or more first chamber(s) of the inserts carrier so as to form together with the inserts the one or more second chambers, each second chamber in operation being located opposite a corresponding first chamber with the one or more inserts at said mounting position being in between said first and second chambers, wherein the first chamber is configured to be connected to a liquid feed duct of the inserts cleaning device during one or more phases of the cleaning process.

In an embodiment, the second chamber(s), e.g. embodied by the one or more housings, are part of the collector device of the inserts cleaning device so that cleaning liquid emerging through the permeable volume from the first chamber will be collected in the opposite second chamber, for example wherein the housing has, for each second chamber, a discharge port in communication with the recirculation assembly, or via a valve arrangement with multiple recirculation assemblies when present in the insert cleaning device.

In an embodiment the insert cleaning device having said first and second component is configured and operated so that during one or more phases of the cleaning process a flow of cleaning liquid from the second chamber, through the permeable volume of the one or more inserts, into the first chamber is established.

The present invention also relates to an inserts cleaning device configured to clean inserts that have been temporarily detached from a moulding device for moulding food products from a pumpable foodstuff mass, which moulding device comprises a movable mould member having food product moulding inserts that are temporarily detachable for cleaning, wherein each food product moulding insert has:
  an outer face,
  one or more recessed mould cavities, each mould cavity defining a shape of the product which is to be moulded, the mould cavities each having an opening in the outer face for the introduction of foodstuff mass into the mould cavity and for the ejection of the moulded product,
  an inner face,
  a permeable volume between the inner face and the one or more mould cavities, said permeable volume comprising openings opening out at the one or more mould cavities of the insert,
  such that each mould cavity of the insert is delimited at least in part by a permeable volume, to allow for, in operation of the moulding device, passing of pressurized ejection fluid from the inner face through the permeable volume to the mould cavity in order to assist release of the food product formed in the mould cavity from the insert,
  and wherein the inserts cleaning device comprises a first component, e.g. an inserts carrier as described herein, that delimits a first chamber having an opening, and a second component, e.g. a housing as described herein, that delimits a second chamber having an opening, wherein first and second component are configured such that an insert to be cleaned can be placed at least with its permeable volume between the first and second chambers so that the first and second chambers are opposite one another, and wherein at least the first chamber is connected to a cleaning liquid feed duct thereby allowing for feeding cleaning liquid by a pump of the inserts cleaning device via the cleaning liquid feed duct to the first chamber, which cleaning liquid then passes through the permeable volume of the insert and exits the permeable volume to arrive in the second chamber, the cleaning liquid being discharged from the second chamber, e.g. recirculated via a recirculation assembly as described herein.

The present invention also relates to an installation for production of food products, e.g. to perform a method as described herein, said installation comprising:
  a moulding device for moulding the food products from a pumpable foodstuff mass, the moulding device comprising a movable mould member having food product moulding inserts that are temporarily detachable for cleaning, wherein each food product moulding insert has:
  an outer face,
  one or more recessed mould cavities, each mould cavity defining a shape of the product, which is to be moulded, the mould cavities each having an opening in the outer face for the introduction of foodstuff mass into the mould cavity and for the ejection of the moulded product,
  an inner face,
  a permeable volume between the inner face and the one or more mould cavities, said permeable volume comprising openings opening out at the one or more mould cavities of the insert,
  such that each mould cavity of the insert is delimited at least in part by a permeable volume, to allow for, in operation of the moulding device, passing of pressurized ejection fluid from the inner face through the permeable volume to the mould cavity in order to assist release of the food product formed in the mould cavity from the insert,
  an inserts cleaning device, comprising:
  an inserts carrier configured to temporarily mount thereon multiple food product moulding inserts, that have been temporarily detached from the movable mould member, at respective insert mounting positions,
  one or more cleaning liquid feed ducts,
  a pump connected to the one or more cleaning liquid feed ducts, the one or more liquid feed ducts leading from the pump to the mounting positions of the inserts carrier,
  optionally, a collector device for collecting cleaning liquid,
  optionally, a cleaning liquid recirculation assembly extending from the collector device to the pump,
  optionally, a filter device arranged in the recirculation assembly,
  wherein the installation comprises one or more, preferably multiple, exchangeable inserts carriers,
  wherein each exchangeable inserts carrier is connectable to a main structure of the inserts cleaning device, which main structure, preferably, comprises a pump and at least a portion of a liquid feed duct, optionally also a recirculation assembly, and optionally also a filter device.

The present invention also relates to a method for cleaning food product moulding inserts that have been temporarily detached from a movable mould member of a moulding device that is configured for moulding food products from a pumpable foodstuff mass, wherein each food product moulding insert has:
  an outer face,
  one or more recessed mould cavities, each mould cavity defining a shape of the product, which is to be moulded, the mould cavities each having an opening in the outer face for the introduction of foodstuff mass into the mould cavity and for the ejection of the moulded product, an inner face, a permeable volume between the inner face and the one or more mould cavities, said permeable volume comprising fine openings opening out at the one or more mould cavities of the insert, such that each mould cavity of the insert is delimited at least in part by a permeable volume, to allow for, in operation of the moulding device, passing of pressurized ejection fluid from the inner face through the permeable volume to the mould cavity in order to assist release of the food product formed in the mould cavity from the insert, wherein, in the method, use is made of an inserts cleaning device comprising:

one or more inserts carriers, each configured to temporarily mount thereon multiple food product moulding inserts, that have been temporarily detached from the movable mould member, at respective insert mounting positions of the inserts carrier one or more clamping assemblies that are adapted and used to releasably clamp each of the inserts onto the respective mounting position of the inserts carrier.

For example, each insert has a circular periphery and each clamping member comprises or is formed by a ring that can be arranged about the insert. For example, the ring is embodied to be secured on the inserts carrier, e.g. the mounting position of the inserts carrier having a threaded portion and the ring having a mating threaded portion.

The present invention also relates to an exchangeable inserts carrier as described herein.

The present invention also relates to method for cleaning food product moulding inserts that have been temporarily detached from a movable mould member of a moulding device that is configured for moulding food products from a pumpable foodstuff mass, wherein each food product moulding insert has:

an outer face, one or more recessed mould cavities, each mould cavity defining a shape of the product which is to be moulded, the mould cavities each having an opening in the outer face for the introduction of foodstuff mass into the mould cavity and for the ejection of the moulded product, an inner face, a permeable volume between the inner face and the one or more mould cavities, said permeable volume comprising fine openings opening out at the one or more mould cavities of the insert, such that each mould cavity of the insert is delimited at least in part by a permeable volume, to allow for, in operation of the moulding device, passing of pressurized ejection fluid from the inner face through the permeable volume to the mould cavity in order to assist release of the food product formed in the mould cavity from the insert, wherein the method comprises the use of one or more exchangeable inserts carriers as described herein.

A second aspect of the present invention relates to an installation for production of food products, said installation comprising:

a moulding device for moulding the food products from a pumpable foodstuff mass, the moulding device comprising a movable mould member having food product moulding inserts that are temporarily detachable for cleaning, wherein each food product moulding insert has:

an outer face, one or more recessed mould cavities, each mould cavity defining a shape of the product, which is to be moulded, the mould cavities each having an opening in the outer face for the introduction of foodstuff mass into the mould cavity and for the ejection of the moulded product, an inner face, a permeable volume between the inner face and the one or more mould cavities, said permeable volume comprising openings opening out at the one or more mould cavities of the insert, wherein the moulding device is configured to cause, in operation of the moulding device, a passing of pressurized ejection fluid from the inner face of the insert through the permeable volume to the mould cavity in order to assist release of the food product formed in the mould cavity from the insert, an inserts cleaning system, comprising:

one or more inserts carriers, each configured to temporarily mount thereon multiple food product moulding inserts, that have been temporarily detached from the movable mould member, at respective insert mounting positions of the inserts carrier, multiple cleaning stations, wherein the inserts cleaning system is configured to subject the inserts carried by at least one of said one or more inserts carriers to a cleaning related treatment at each cleaning station, a motion system configured to bring at least one of said one or more inserts carriers in a condition with the inserts mounted thereon at respective insert mounting positions into a functional position relative to each of the cleaning stations, so that in said functional position of the inserts carrier the cleaning system is operable to subject the inserts mounted thereon to a cleaning related treatment, and wherein the motion system is configured to move the inserts carrier with the inserts mounted thereon from a functional position relative to one of said cleaning stations to a functional position relative to another one of said cleaning stations in order to subject the inserts mounted on said inserts carrier to a sequence of cleaning related treatments by means of the inserts cleaning system.

The installation of the second aspect of the invention allows for many attractive configurations and operational methods, e.g. in view of logistics, savings in cleaning liquid, etc. For example, in an embodiment, a first station of the cleaning stations is configured to subject the inserts carried by one or more inserts carriers and positioned at the functional position relative to the first station to a cleaning treatment involving a first cleaning liquid, and a second cleaning station is configured to subject the inserts carried by one or more inserts carriers and positioned at the functional position relative to the second station to a cleaning treatment involving a second cleaning liquid that differs in at least one property thereof from the first cleaning liquid. For example, the first station is used to treat the inserts with water mixed with one or more agents, e.g. as discussed herein, whereas the second station is used to treat the inserts with water free of any agents, e.g. hot or cold water, e.g. as a final liquid treatment, e.g. followed by drying at another station of the system.

The possibility to have dedicated stations in the cleaning system that make use of different cleaning liquids, for example, allows to make optimum use of the one or more liquids. Also, a reduction may be achieved in view of energy for heating, e.g. one station being configured to treat the inserts with a heated liquid, whereas another station may be devoid of any heaters for a liquid to be handled by the station.

In an embodiment of the second aspect of the invention the inserts cleaning system comprises at at least one of said cleaning stations an inserts cleaning device as described herein. In an embodiment the inserts cleaning device comprises:

a cleaning liquid feed duct, a pump connected to the cleaning liquid feed duct, a collector device for collecting cleaning liquid, a cleaning liquid recirculation assembly extending from the collector device to the pump, a filter device arranged in the recirculation assembly, wherein the inserts cleaning device and said inserts carrier are configured such that, in the functional position of said inserts carrier, the inserts cleaning device is operable to feed to cleaning liquid by means of said pump to the inserts mounted at the mounting positions of the inserts carrier, said cleaning liquid being forced through the permeable volume and exiting said permeable volume and being collected by said collector device, possibly filtered, and recycled to the pump.

In an embodiment of the second aspect of the invention the inserts cleaning system comprises at a first cleaning station and a second cleaning station a respective first inserts cleaning device and a second inserts cleaning device, wherein the first inserts cleaning device comprises:

a first cleaning liquid feed duct, a first pump connected to the first cleaning liquid feed duct, a first collector device for collecting first cleaning liquid, a first cleaning liquid recirculation assembly extending from the first collector device to the first pump, a first filter device arranged in the first recirculation assembly, wherein the first inserts cleaning device and said inserts carrier are configured such that, in said functional position of said inserts carrier, the first inserts cleaning device is operable to feed to first cleaning liquid by means of said first pump to the inserts mounted at the mounting positions of the inserts carrier, said first cleaning liquid being forced through the permeable volume, exiting said permeable volume, and being collected by said first collector device and recycled to the first pump, and wherein the second inserts cleaning device comprises:

a second cleaning liquid feed duct, a second pump connected to the second cleaning liquid feed duct, a second collector device for collecting second cleaning liquid, a second cleaning liquid recirculation assembly extending from the second collector device to the second pump, a second filter device arranged in the second recirculation assembly, wherein the second inserts cleaning device and said inserts carrier are configured such that, in said functional position of said inserts carrier, the second inserts cleaning device is operable to feed second cleaning liquid by means of said second pump to the inserts mounted at the mounting positions of the inserts carrier, said second cleaning liquid being forced through the permeable volume, exiting said permeable volume, and being collected by said second collector device and recycled to the second pump.

It will be appreciated that each of the one or more inserts cleaning devices and/or the inserts carriers of the installation according to the second aspect of the invention may have one or more of the features as discussed herein, e.g. as addressed in the appended claims.

Preferably, as discussed herein, the installation of the second aspect of the invention comprises multiple inserts carriers, e.g. multiple exchangeable inserts carriers, e.g. each having an embodiment as described herein, e.g. each inserts carrier having branch ducts, possibly also one or more of the valve arrangement, sensor(s), wireless communication, battery, etc., as discussed herein.

The motion system is, preferably, configured to automatically move the one or more inserts carriers handled into and between said functional positions. In an embodiment the motion system is configured to have a single path, so a set sequence. In another embodiment the motion system is configured to have multiple paths along the stations, e.g. the paths representing different sequences of cleaning treatments. For example, the motion system is configured to be programmable, e.g. having a computerized controller, to perform different paths of the inserts carrier(s) handled thereby relative to the stations of the inserts cleaning system.

In an embodiment of the installation according to the second aspect of the invention the inserts cleaning system comprises at at least one of the cleaning stations one or more spray devices, e.g. as described herein. For example, just one station of the installation has only one or more spray devices, configured and operated to spray onto an exposed surface of the inserts, e.g. in a first phase of a cleaning process.

In an embodiment of the installation according to the second aspect of the invention the inserts cleaning system comprises at at least one of said cleaning stations, e.g. at just one station, a drying device, e.g. just a drying device, configured and operated to dry the inserts, e.g. in a final phase of a cleaning process.

In an embodiment of the installation according to the second aspect of the invention the motion system comprises a rail assembly and one or more receivers displaceable along said rail assembly, said rail assembly extending to each of said cleaning stations and each of said receivers being configured to receive an inserts carrier, so that an inserts carrier with the inserts mounted thereon at respective insert mounting positions is movable into said functional position relative to each of said cleaning stations.

In an embodiment of the installation according to the second aspect of the invention the motion system comprises an inserts carrier handling robot having one or more receivers, e.g. the robot being provided with a spatially mobile robot arm supporting at least one receiver, each of said receivers being configured to receive an inserts carrier, wherein the handling robot has an operational reach so that an inserts carrier with the inserts mounted thereon at respective insert mounting positions is movable by said handling robot into said functional position relative to each of said cleaning stations.

In an embodiment of the installation according to the second aspect of the invention the motion system comprises a revolving receiver support structure, e.g. a turret structure, having one or more receivers thereon, said revolving structure being rotatable about an axis, e.g. a vertical axis, e.g. by an indexing drive mechanism of the motion system, so as to move the one or more receivers along a circular path, and wherein said cleaning stations are arranged at spaced apart locations along said circular path, so that an inserts carrier with the inserts mounted thereon at respective insert mounting positions is movable by said revolving structure into said functional position relative to each of said cleaning stations.

The second aspect of the invention also relates to a method for cleaning food product moulding inserts that have been temporarily detached from a movable mould member of a moulding device that is configured for moulding food products from a pumpable foodstuff mass, wherein each food product moulding insert has:

an outer face, one or more recessed mould cavities, each mould cavity defining a shape of the product which is to be moulded, the mould cavities each having an opening in the outer face for the introduction of foodstuff mass into the mould cavity and for the ejection of the moulded product, an inner face, a permeable volume between the inner face and the one or more mould cavities, said permeable volume comprising openings opening out at the one or more mould cavities of the insert, such that each mould cavity of the insert is delimited at least in part by a permeable volume, to allow for, in operation of the moulding device, passing of pressurized ejection fluid from the inner face through the permeable volume to the mould cavity in order to assist release of the food product formed in the mould cavity from the insert, wherein, in the method, use is made of an installation according to second aspect of the invention, and wherein the motion system brings at least one of said one or more inserts carriers of the installation in a condition with the inserts mounted thereon at respective insert mounting positions into a functional position relative to each of the cleaning stations, and wherein in said functional position of the inserts carrier the cleaning system is operated to subject the inserts mounted thereon to a cleaning related treatment, and wherein the motion system moves the inserts carrier with the inserts mounted thereon from a functional position relative to one of said cleaning stations to a functional position relative to another one of said cleaning stations in order to subject the inserts mounted on said inserts carrier to a sequence of cleaning related treatments by means of the inserts cleaning system.

In an embodiment of said method of the second aspect of the invention use is made of a first and second inserts cleaning device, e.g. as described herein, wherein the first inserts cleaning device subjects the inserts to a cleaning treatment by means of a first cleaning liquid and wherein the second inserts cleaning device subjects the inserts to a cleaning treatment by means of a different, second liquid.

It will be appreciated that any methods, installations, insert cleaning devices, stations, and/or (exchangeable) inserts carriers as described herein, also with respect to the second aspect of the invention, may have one or more of the features discussed herein as optional features, e.g. features mentioned in any of the claims.

The present invention also relates to any methods, installations, insert cleaning devices, stations, and/or (exchangeable) inserts carriers as described herein, as well as the use thereof, e.g. in a method for cleaning of food product moulding inserts as described herein.

BRIEF DESCRIPTION OF THE DRAWINGS

The invention will be further explained in relation to the drawings, in which.

DETAILED DESCRIPTION OF VARIOUS EMBODIMENTS

Figure 1:
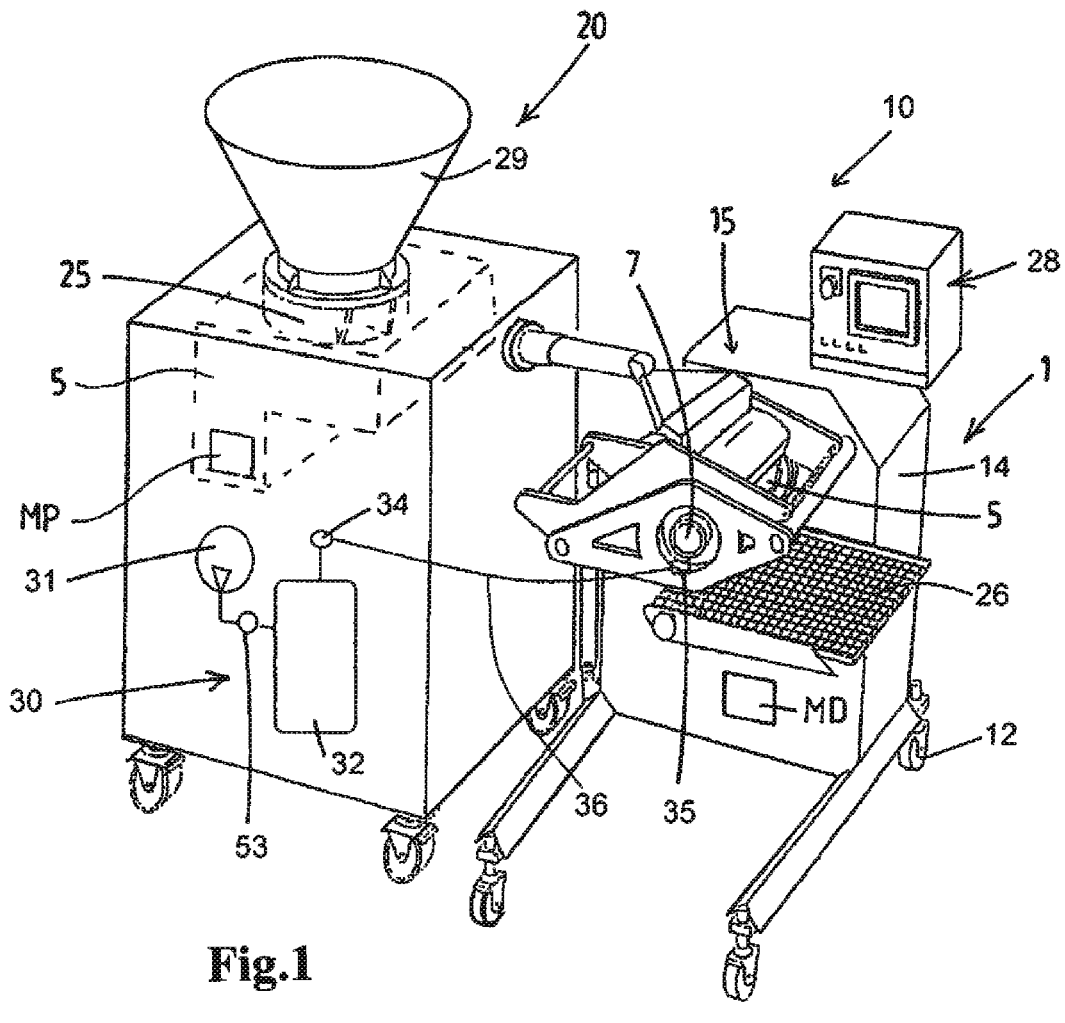
FIG. 1 is a perspective view of a rotary cylindrical mould drum in a moulding installation for moulding food products from a pumpable foodstuff mass.

In FIG. 1 a moulding installation 10 is shown. The installation is, for example, envisaged for the production of moulded food products from ground meat, e.g. ground poultry meat, ground beef, ground pork, mixtures of ground meat, etc. For example, the installation is embodied to mould patties, nuggets, drumstick resembling meat products, or the like.

The installation comprises in this embodiment a moulding device 1 and a pump device 20, e.g. a meat pump device 20.

The moulding device 1 comprises a frame 14, here a wheeled frame with wheels 12 allowing to ride the device 1 over a floor of a production plant.

The device 1 further comprises a moveable mould member, here embodied as a mould drum 16 having an outer circumferential drum surface 17 and a longitudinal drum rotation axis 7. The drum 16 is rotatably supported by the frame 14 to revolve about the drum rotation axis 7, here as preferred a horizontal axis 7.

Permeable food product moulding inserts (not shown in detail in FIG. 1) are provided that can temporarily be detached from the movable mould member. Each insert has a fluid tight outer face, and one or more recessed mould cavities, each mould cavity defining a shape of the product, which is to be moulded, the mould cavities each having an opening in the outer face for the introduction of foodstuff mass into the mould cavity and for the ejection of the moulded product. The multiple recessed mould cavities are present, e.g. in rectilinear or helical lanes, each lane comprising a group of multiple cavities. Each mould cavity has a fill opening for introduction of foodstuff mass into the mould cavity.

A mould drum drive 15 is coupled to the drum 16 to drive the drum in a rotation direction D, e.g. at a constant speed or in some other fashion, e.g. intermittently or with variable speed, e.g. slow or stopped when filling of a row of mould cavities takes place and faster in between two successive lanes of mould cavities.

A mass feed member 18 is arranged at a fill position relative to the outer circumferential drum surface. This mass feed member has a chamber 23 with an inlet for foodstuff mass to introduce said foodstuff mass into the chamber and with a mouth facing the drum surface 17. The mass feed member 18 is adapted to transfer foodstuff mass into passing mould cavities of the revolving mould drum 16, e.g. in a lane per lane manner, when the fill opening of a mould cavity, or of a lane of mould cavities, is in communication with the mouth at this fill position. The foodstuff mass forms a food product in the mould cavity.

The mouth can, for example, have the shape of an elongated, e.g. straight slot, extending parallel to the drum axis 7, wherein the width of the slot is smaller than the corresponding circumferential dimension of the mould cavities.

In another, known, embodiment the mouth is embodied with an orificed outlet structure having multiple orifices, e.g. over a surface that matches approximately the size of the filling opening of the mould cavity. In an embodiment with an orificed mouth having a multitude of orifices to fill the passing cavities, e.g. arranged in rows or otherwise, the pressure to be exerted on the mass may be relatively high due to the resistance that the mass experiences when passing through the orifices.

As part of a foodstuff mass feed and pressurization system of the installation the pump device 20 comprises a pump 25 with drive motor MP, e.g. an electrically driven, variable RPM, rotary vane pump as schematically depicted here.

The installation may comprise a hopper 29 into which the foodstuff mass is introduced, e.g. batches of ground meat mass. The hopper 29 is connected to the inlet of the pump 25. In an embodiment, the hopper 29 is equipped with one or more augers to advance the mass to said pump inlet.

The pump P feeds the mass to the inlet of the mass feed member, and in this example, in absence of any other means that can pressurize the mass before transfer into the mould cavity, this pump P controls the pressure of the mass in the chamber. The mass then flows via the mouth in the mould cavities, e.g. into a lane of mould cavities.

In embodiments, the mass feed member mouth may be a single elongated slot shaped mouth, e.g. spanning the series of mould cavities on the drum. In other embodiments, the mouth may be an orificed mouth formed by a multitude of outlet orifices so that rather small substreams of mass enter into the mould cavity. Other embodiments of the mouth are also possible.

In the vicinity of the underside of the moulding drum 16, there is a discharge belt 26 on which ejected food products drop from the drum 16 and via which the ejected products can be conveyed onwards. For example, the products are then fed to one or more of a coating device, an oven, a freezer, and/or a packaging installation.

The moulding installation 10 also comprises a controller 28 configured to control the various components and functions of the installation.

The food products ejection system of the installation 10 in this example comprises a pressurized air source 30, e.g. a compressor 31 with a pressurized air storage tank 32 and a pressure regulating valve 53 and an air control valve 34 at the outlet of the tank 32. This source 30 is operable to feed pressurized air at a regulated ejection air pressure thereof to an air emitter 35 that is arranged near the revolving drum 16, here at a head end thereof. In operation, the ejection fluid inlets of the drum sequentially pass the air emitter 35 and align therewith; the valve 34 is then briefly opened to emit a burst of air into the inlet and the connected channel(s). This air then flows out of permeable surface of the permeable volume and, as is known in the field, facilitates and/or causes ejection of the moulded food product from the one or more mould cavities at the product ejection or release position.

The computerized controller 28 of the installation is linked, e.g. by cable and/or wireless, to the pump device 20. The controller 28, e.g. via a touchscreen with graphic user interface, is adapted to allow for inputting, e.g. by an operator of the installation, of at least one target parameter related to filling of the mould cavities with the foodstuff mass via the mouth of the mass feed member. The mentioned at least one target parameter that can be inputted into the controller 28 is for example:

a target fill pressure for the foodstuff mass in the chamber of the mass feed member and/or in the mould cavity to be caused by said foodstuff mass feed and pressurization system, here by operation of the pump 25, and/or a target volumetric flow rate for the foodstuff mass into the chamber of the mass feed member and/or into the mould cavity to be caused by said foodstuff mass feed and pressurization system, and/or a target rotational speed (RPM) of the mould drum.

The computerized controller 28 may be programmed, e.g. on the basis of dedicated software loaded and run on the computer, to automatically set an ejection air pressure by the pressurized air source 30 on the basis of an inputted target parameter.

Figures 3, 4:
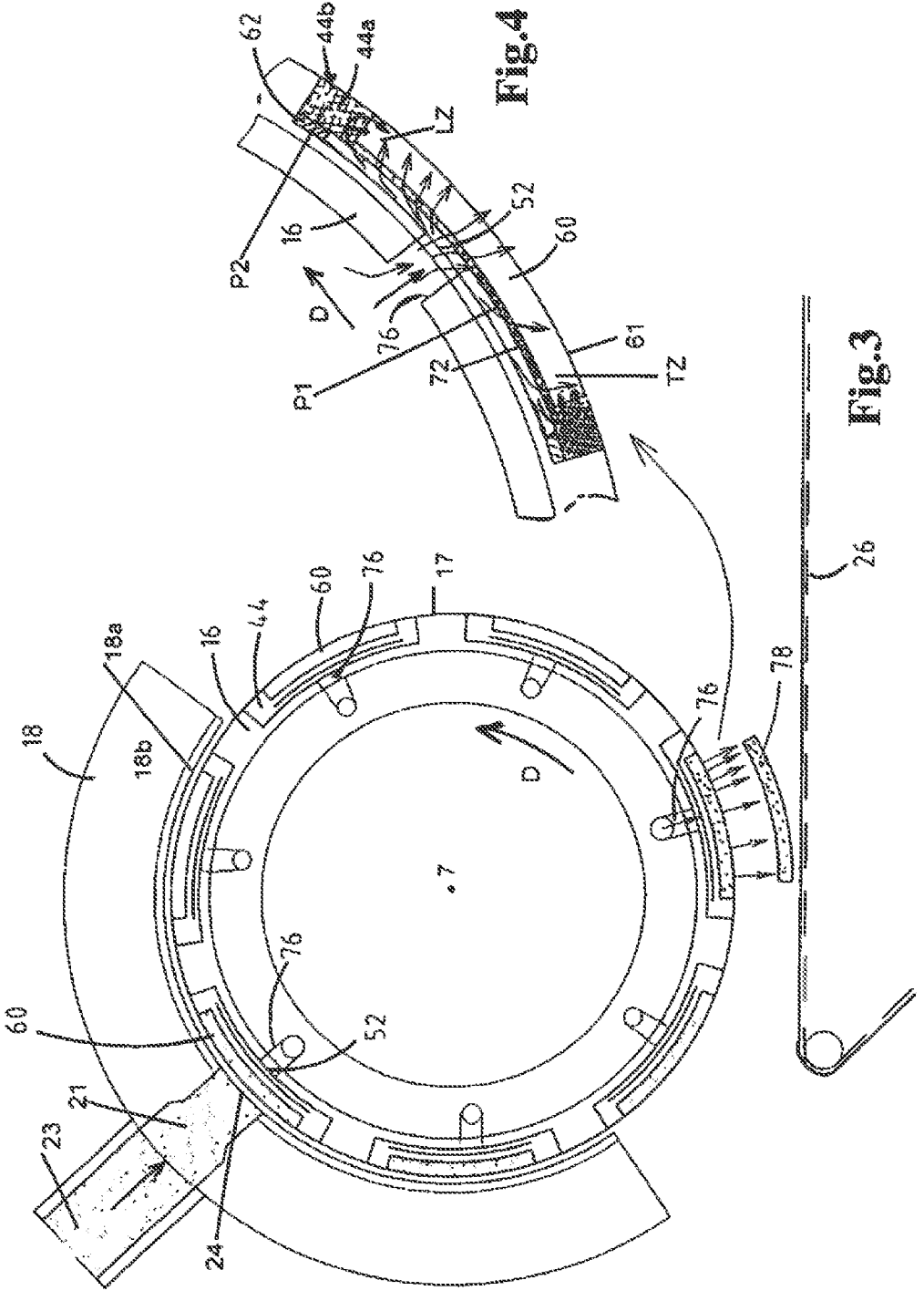
FIG. 3 is a cross-sectional view of the mould drum of FIG. 1.
FIG. 4 is a detail of a mould cavity of the mould drum of FIG. 3.

An embodiment of the mass feed member 18 and the drum surface 17 with multiple inserts provided with recessed mould cavities 60 is shown in more detail in FIGS. 2-4.

The mass feed member 18 is shown in operation, arranged at a fill position relative to the drum surface 17. The mass feed member has a chamber 23 with an inlet for foodstuff mass to introduce said foodstuff mass into the chamber and with a mouth 24 facing the drum surface 17, said mass feed member being adapted to transfer mass into passing mould cavities 60 of the rotating mould drum when an opening of a mould cavity is in communication with the mouth 24 at said fill position, said mass forming a food product in said mould cavity.

The mould cavities 60 each have an opening 61 in the outer surface of the insert for the introduction of foodstuff mass into the mould cavity, and for the ejection of the moulded product.

The shown embodiment of the mass feed member 18 has one or more flexible plates 18a, preferably of plastic material, which in operation is/are held against the outer circumference 17 of the drum under pressure that is produced by a pressure device, e.g. a pneumatic device, e.g. comprising pneumatically actuated rigid supports for the plate 18a, e.g. lamellae 18b.

A pneumatic cushion or actuator holding the flexible plate 18a under pressure against the drum is for example embodied as an elongated inflatable member arranged between a rigid housing of the mass feed member or the device 1 and the plate 18a onto which it exerts pressure. Alternatively, the pneumatic cushion is embodied as a pneumatic cylinder. Preferably, the beams or lamellae 18b are positioned transversely with respect to the direction of rotation of the drum and are arranged between the pressure cushion and the plate 18a. These lamellae may provide lines with a high rigidity in the axial direction of the drum, while the plate 18a is able to follow deviations in the diameter of the drum.

In the shown embodiment, the flexible plate 18a, as seen in the circumferential direction of the drum, extends on either side of the mouth 24.

In the embodiments shown in FIGS. 2a-7, the cylindrical mould drum 16 comprises multiple inserts 44. Rectangular recesses 42 are provided in an outer circumference 17 of the moulding drum 16. Exchangeable porous inserts 44, of corresponding dimensions can be secured in these recesses 42.

Here bores 46 are provided at the corners of an insert 44, aligned with threaded holes 47 in a base 48 of the recess 42, and bolts 50 can be fitted into them. Recess 44 comprises the mould cavity 60 delimited by permeable volume 44a, while spacer 62 is a flat plate in which there is a through-opening 72, the dimensions of which are larger than the mould cavity 60.

The recesses 44 each have a curved outer surface 44b forming at least part of the outer circumferential drum surface, which curved outer face of the permeable insert is fluid tight. The inserts of the embodiment of FIGS. 2a-7 each comprise only one mould cavity 60, surrounded by a permeable volume 44a comprising fine openings opening out at the mould cavity 60, such that each one of the mould cavities of the permeable mould body is delimited at least in part by a permeable volume. As explained herein, in embodiments a mould body may well have multiple mould cavities therein, e.g. in a lane of cavities.

The rotary cylindrical mould drum 16 further comprises multiple ejection fluid inlets 54, each associated with a mould cavity or a lane of cavities 60. The inlets 54 are here provided at head end 56 of the drum.

When an ejection fluid inlet 54, due to revolving of the drum 16, arrives at the location of the air emitter 35 that is connected via line 36 to the rest of the system 30, the inlet 54 is fed with a burst of pressurized ejection fluid, here compressed air. This burst can be governed by a valve or be the result of the inlet 54 coming into communication with the emitter 35.

Channels 76, of which examples are visible in the cross-sectional view in FIGS. 3 and 4, extend from said at least one ejection fluid inlet 54 to the permeable volumes 44a. The channels 76 provide communication from the at least one ejection fluid inlet 54 via the channels 76 and via the permeable volumes 44a into the mould cavities 60 to assist in ejection of the moulded product 78 from a mould cavity 60.

The ejection fluid inlet 54 allows the entry of pressurized fluid with a volumetric flow rate, which volumetric flow rate naturally decreases over the number and length of the channels, and through the permeable volume.

Figures 2A, 2B:
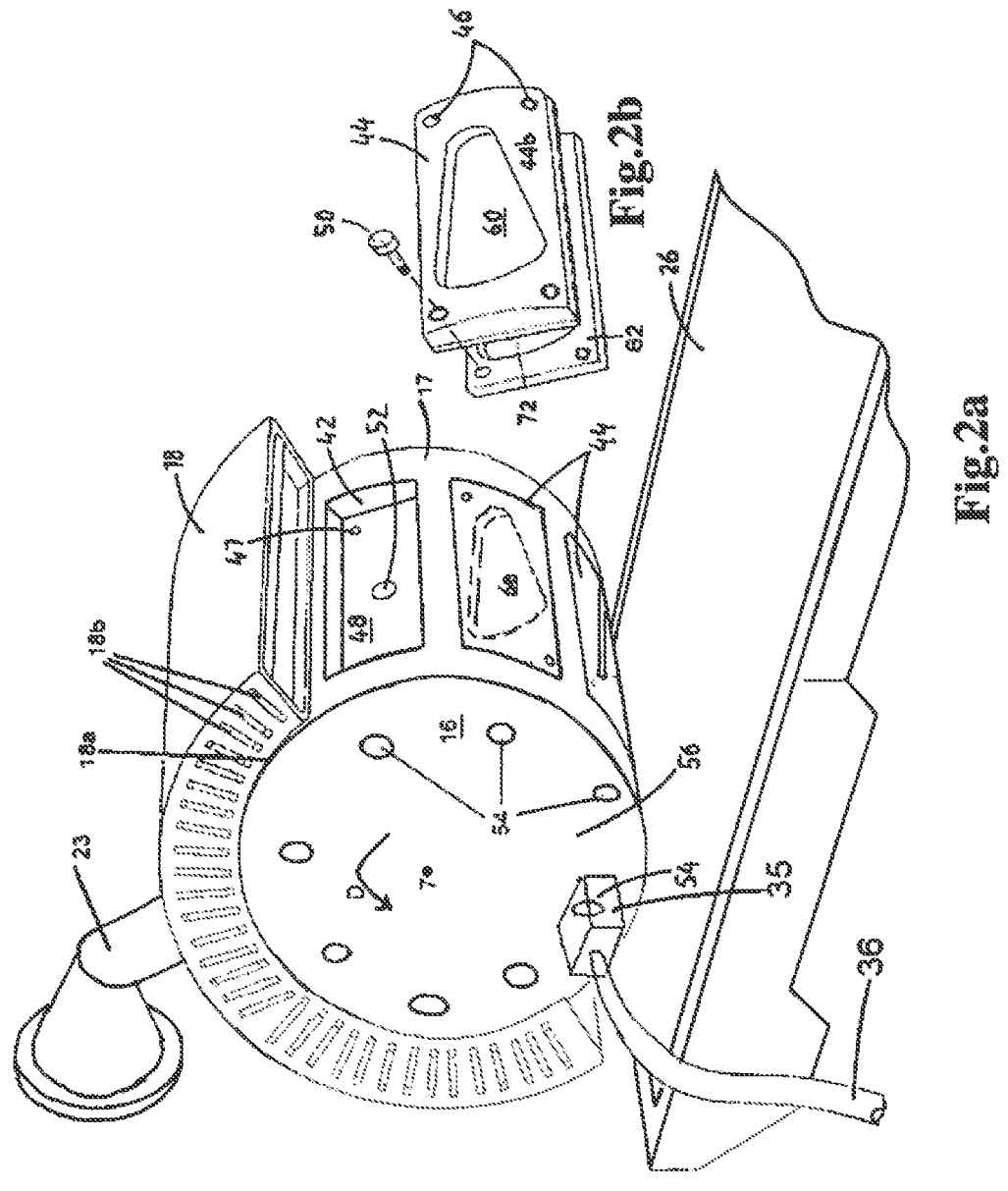
FIG. 2*a* is a detailed perspective view of the mould drum of FIG. 1.
FIG. 2*b* represents a detail of FIG. 2*a;*

In the embodiment of FIGS. 2a and 2b, in the base 48 of a recess 42 there is an opening 52 which is in communication, via a channel 76, with an ejection fluid inlet 54 at a head end 56 of the moulding drum 16.

Figures 5, 6:
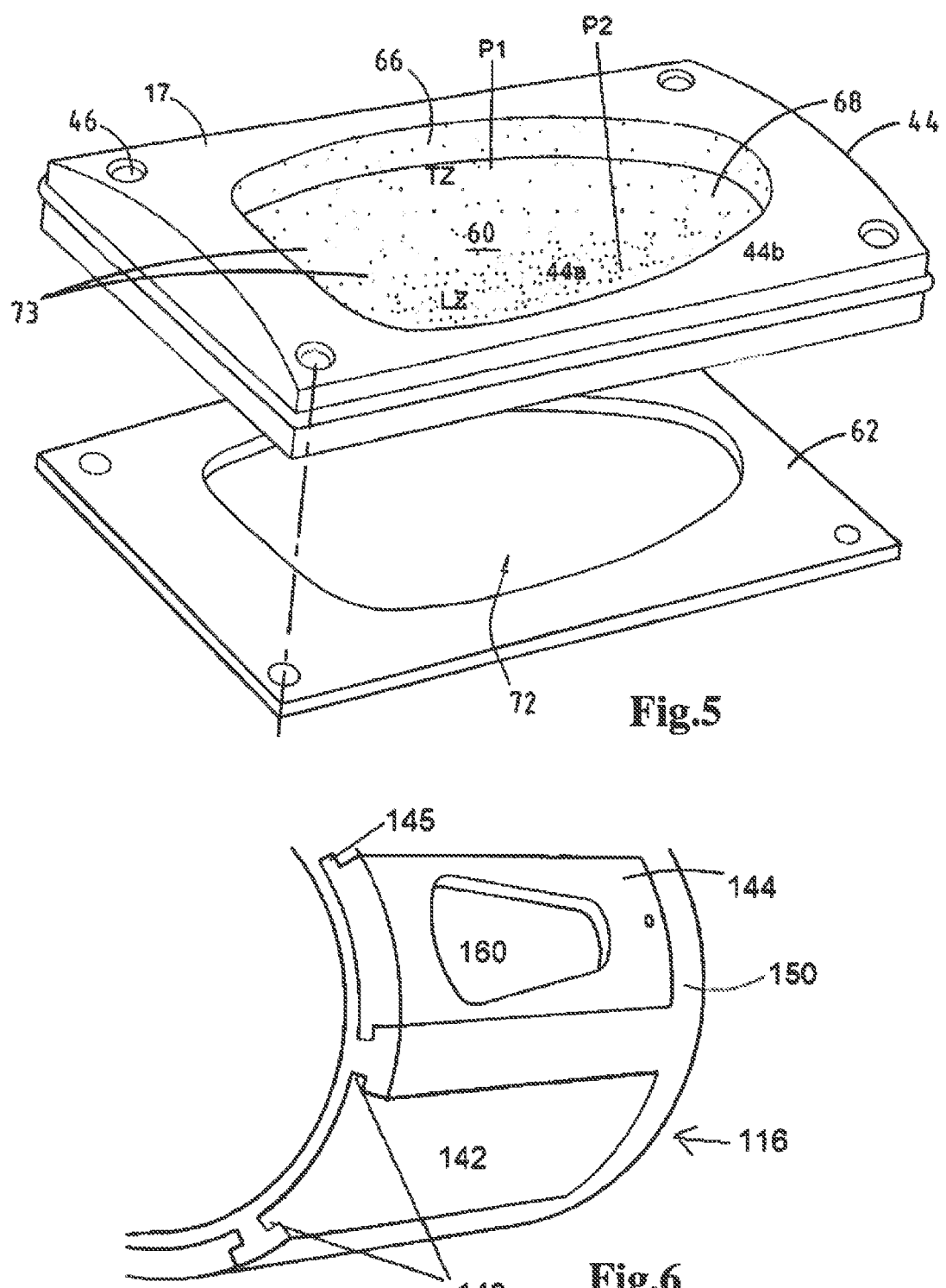
FIG. 5 is a detail of a mould cavity according to an aspect of the invention.
FIG. 6 shows a perspective detail of an alternative embodiment of a permeable mould body with mould cavity.

In the permeable insert 44 shown in FIG. 5, the recessed mould cavity 60 is delimited by permeable volume 44a. Fine openings 73 open out at the mould cavity, in the shown embodiment at vertical walls 66 and base 68 of the mould cavity 60. Irregularly shaped mould cavities will not have a distinct wall and base.

In FIG. 6 an alternative embodiment of a permeable insert 144 with mould cavity 160 is shown. The moulding drum 116 illustrated in this drawing comprises a support member 150, which is provided in its outer wall with recesses 142 which have a widened base 148, extending in the longitudinal direction. Inserts 144 with correspondingly widened base 145 and with a mould cavity 160 can be pushed into the recesses 142 from an end of the moulding drum 116.

Figure 7:
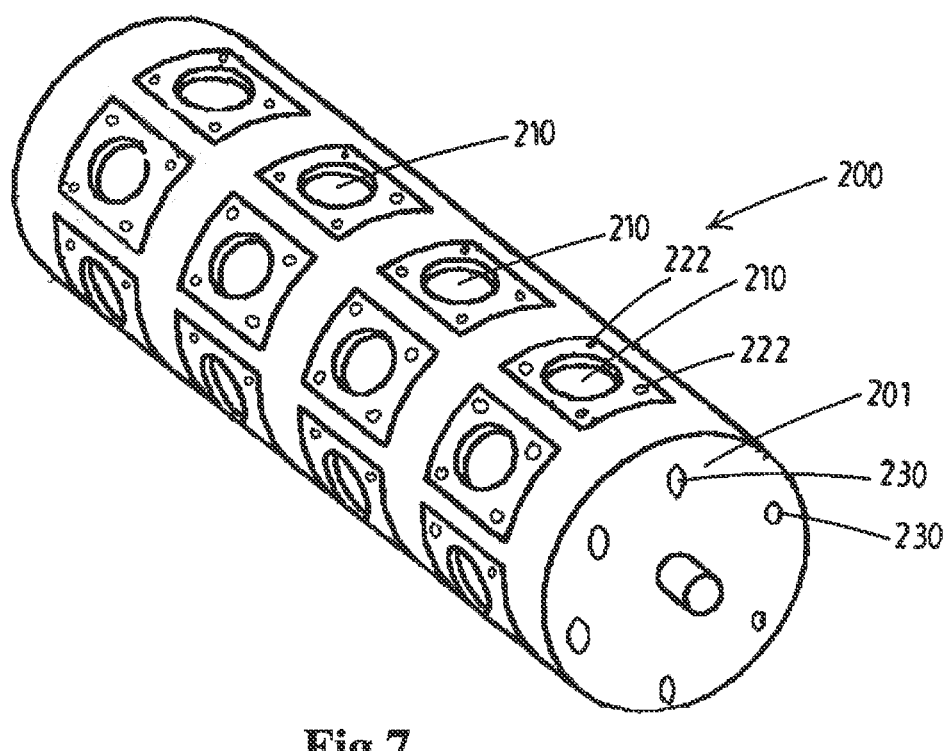
FIG. 7 shows in a perspective view an alternative embodiment of a mould drum of an installation according to the present invention.

In FIG. 7 a mould drum 200 is shown, e.g. to be mounted on the moulding device 1 as discussed above.

The mould drum 200 has a base structure 201, e.g. adapted to be mounted onto a spindle that extends through a central bore of the base structure, e.g. as known in the art.

Figure 8:
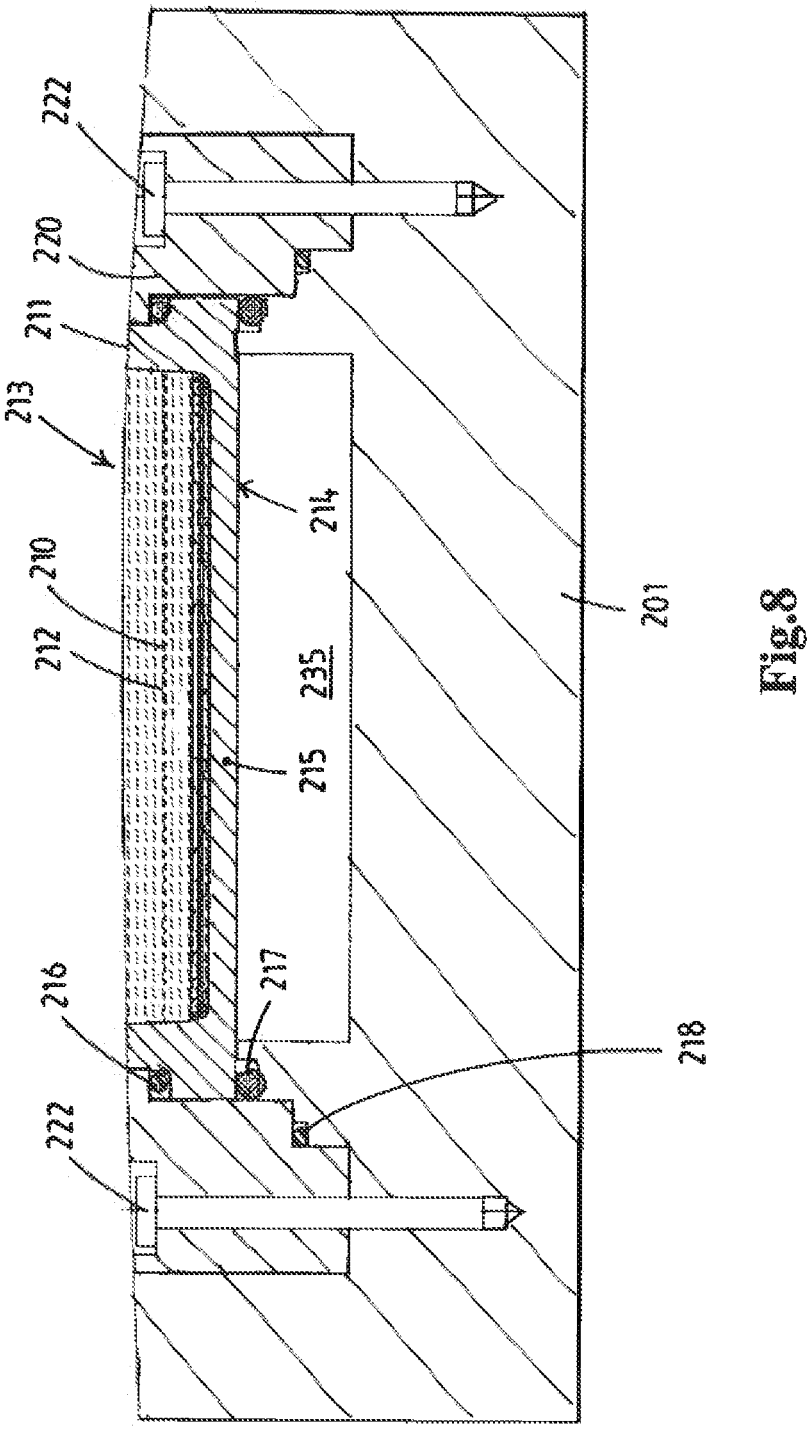
FIG. 8 shows a cross section of a portion of the mould drum of FIG. 7.

The base structure 201 is provided with mounting formations, e.g. recesses, for mounting therein detachable inserts 210. As shown in FIG. 8 in more detail each insert 210 is retained by a corresponding retaining member 220, e.g. clamped between the base structure 201 and the retaining member 220. As shown, in embodiments, the retaining member 220 is releasably secured to the base structure 201, here with the use of one or more bolts 222. In this example the bolts 222 are screwed fit into related bolt holes in the base structure 201.

It is shown here that a sealing member, here an elastomeric sealing ring 216 is mounted about the periphery of the insert 210 to create a fluid seal between the insert 210 and the retaining member 220. It is also shown here that a sealing member, here an elastomeric sealing ring 217 is arranged between the insert 210 and the base structure 201.

It will be appreciated that in embodiment the insert 210 and the retaining member 220 form an integral unit that is handled, in particular detached from the base 201 and then cleaned, as the insert 210 in the manner described herein.

In the arrangement illustrated the sealing members 216, 217 are compressed as the insert 210 is secured onto the base structure 201, here by means of the bolts 222.

A further sealing member, here an elastomeric sealing ring 218, is provided between the retaining member 220 and the base structure 201.

As preferred the retaining member 220, as well as the base structure 201, are devoid of any permeable surface or volume, so that they can be easily cleaned. For example, for cleaning the retaining members 220 only a spray device is required, e.g. similar to a household dishwasher arrangement. Another approach could be an arrangement similar to a car wash arrangement. For example, the cleaning device has multiple stations wherein the base structure and/or any retaining members are conveyed from one station to the next in subjected at each station to a specific action, e.g. spraying at different stations with different cleaning liquids and/or intensities, drying at a final station, etc. Cleaning of the base structure 201 and/or of any retaining members, may, if desired, be done by a portable cleaning device, e.g. a jet cleaner is commonly used in the food industry for cleaning.

In this FIG. 7, it is illustrated that several inserts 210 are mounted in a linear row, parallel to a rotation axis of the mould drum 200. There are several, here six, of such rows over the circumference, so in rotational direction, of the drum 200. For each row of inserts 210, the drum 200 has one or more ejection fluid inlets 230. Here the inlets 230 are provided at the head end of the drum and each connect to a respective channel 235 that is delimited by the base structure 201 of the drum. The channel 235 here extends underneath the row of inserts 210. The channels 235 provide communication from the ejection fluid inlets 230 via the channels 235 and via the permeable volumes into the mould cavities 210 to assist in ejection of the moulded product from each mould cavity.

As shown in more detail in FIG. 8, each insert 210 is of generally circular design. Other shapes of the periphery also of course also contemplated within the scope of the invention. The insert 210 has an outer face 211, here a fluid tight outer face. The insert 201 here has a single recessed mould cavity 212 that defines a shape of the product which is to be moulded, e.g. a circular meat patty, e.g. a hamburger. The mould cavity 212 has an opening 213 in the outer face for the introduction of foodstuff mass into the mould cavity 212 and for the ejection of the moulded product. The insert also has an inner face 214. A permeable volume 215, e.g. of porous sintered metal or 3D printed plastic, is present between the inner face 214 and the mould cavity 212, said permeable volume comprising fine openings opening out at the one or more mould cavities of the insert.

As discussed above each mould cavity of the insert is delimited at least in part by the permeable volume 215, to allow for, in operation of the moulding device 1, passing of pressurized ejection fluid from the inner face 214 through the permeable volume 215 to the mould cavity 212 in order to assist release of the food product formed in the mould cavity from the insert 210.

When production of food products using the mould drum 200 is completed, e.g. stopped at the end of a shift or the end of a production day, it may be desired, or required, to thoroughly clean the mould drum 200. It is envisaged, as an embodiment of the inventive method, that an operator first removes the entire mould drum 200 from the device 1, e.g. using a lifting and transportation trolley. Then the operator removes the inserts 210 by undoing the bolts 222. As will be appreciated a power tool may be used to undo the bolts 222.

In an embodiment an automated device, e.g. a robot holding a power tool, is used to release the inserts 210 from the base structure 201 of the mould member 200.

Figure 9:
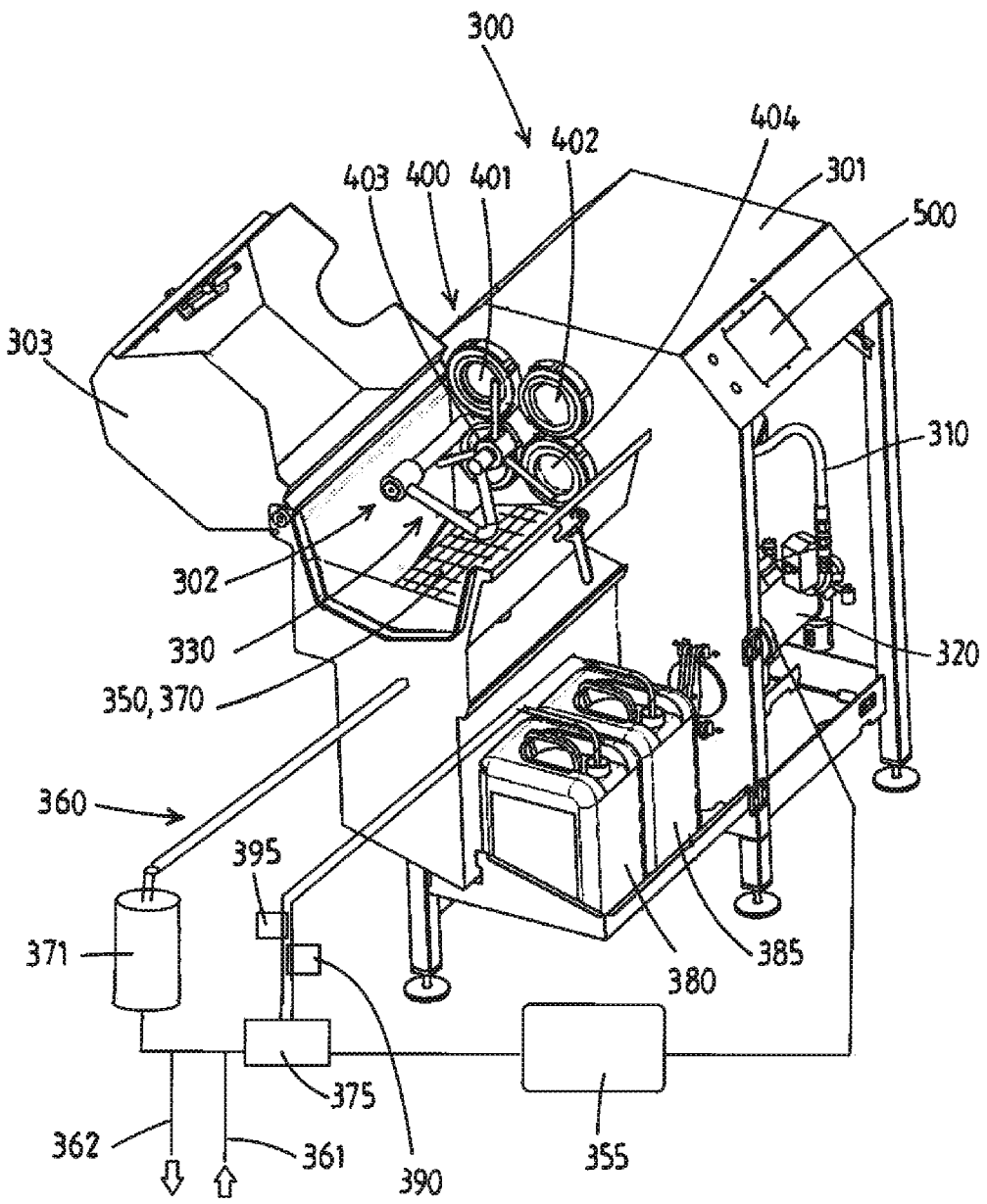
FIG. 9 shows an insert cleaning device according to the invention.
Figure 11:
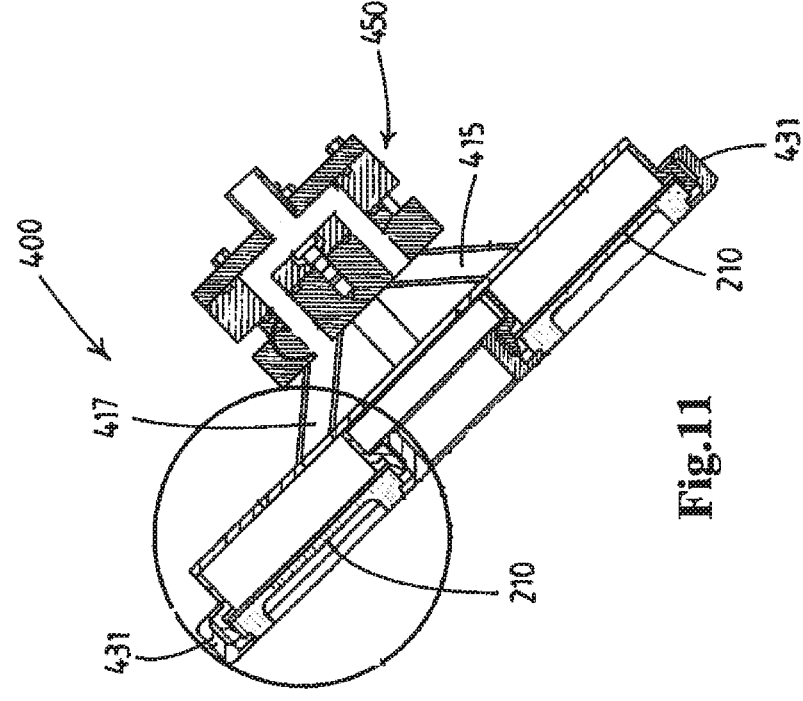
FIG. 11 shows a cross section of the loaded inserts carrier of FIG. 10.
Figure 10:
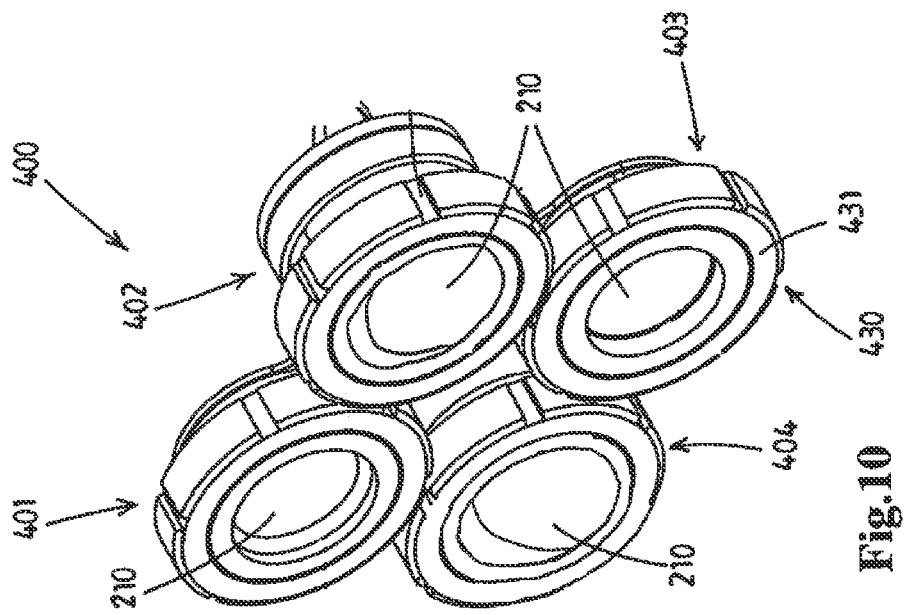
FIG. 10 shows a view on a loaded inserts carrier according to the invention.
Figures 12, 13:
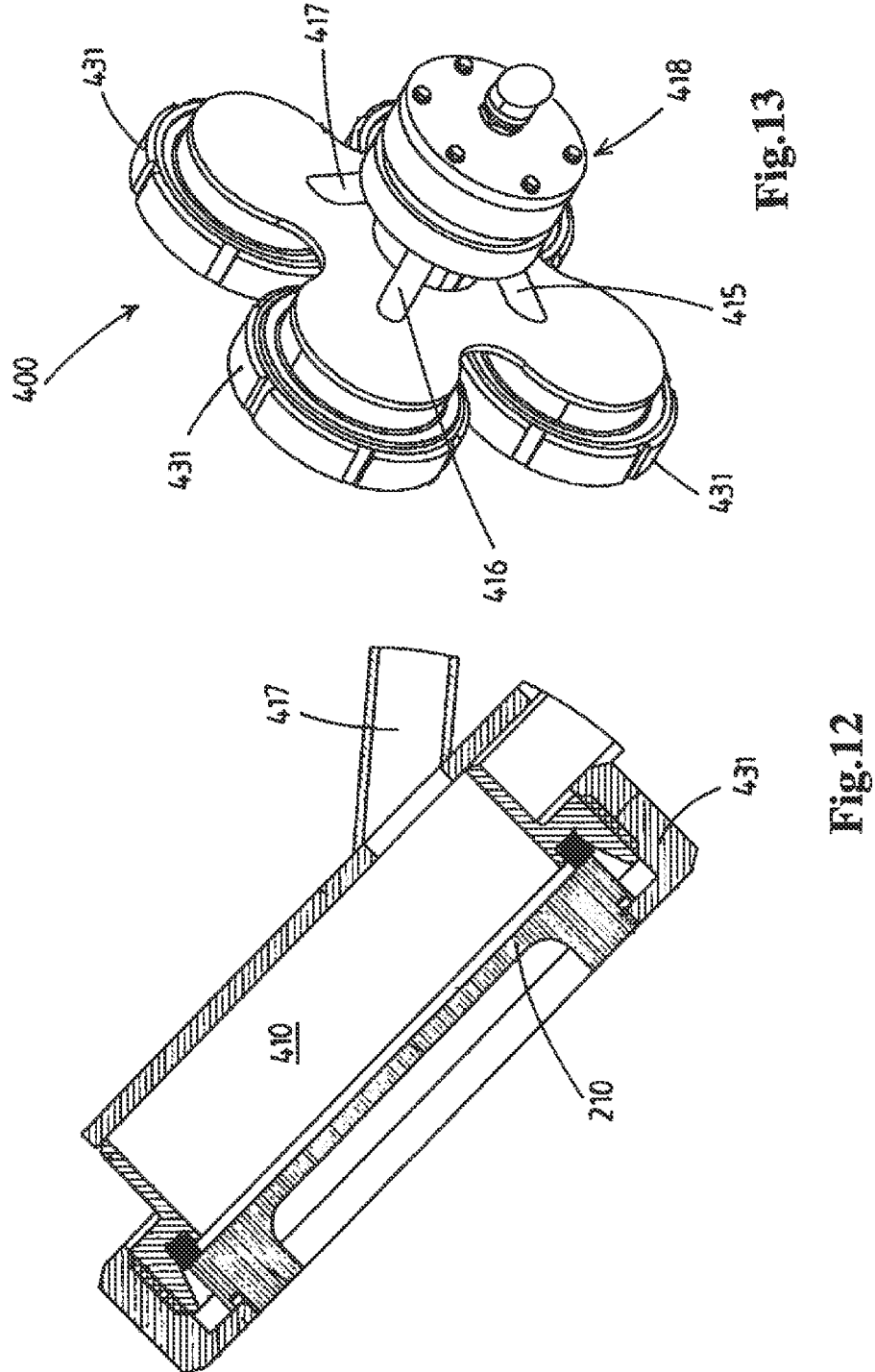
FIG. 12 shows a detail of FIG. 11 on a larger scale.
FIG. 13 shows the inserts carrier of FIG. 10 from behind.

The FIG. 9 shows an example of an insert cleaning device 300. This device 300 comprises:

an inserts carrier 400 configured to temporarily mount thereon multiple inserts 210 at respective insert mounting positions 401,402,403, 404, one or more cleaning liquid feed ducts 310, a pump 320 connected to the one or more cleaning liquid feed ducts 310, the one or more liquid feed ducts leading from the pump 320 to the mounting positions 401,402,403, 404 of the inserts carrier 400, a spray device 330, a collector device 350 for collecting cleaning liquid, a cleaning liquid recirculation assembly 360 extending from the collector device 350 to the pump 320, a heater 355 for heating liquid in the device 300, an inlet 361 for water, e.g. clean, non-heated water, a discharge outlet 362 to discharge cleaning liquid from the device 300, e.g. into a sewer and/or a waste treatment facility, a filter device having one or more filters, here filter 370 and filter 371, arranged in the recirculation assembly, storage containers 380, 385 wherein agents are stored that are to be mixed with water to create one or more cleaning liquids, e.g. disposable plastic storage containers, cleaning liquid agent pumps 390, 395 that are configured to pump agent out of the respective storage container, a mixing device 375 configured to mix the one or more agents from the one or more storage containers 380, 385 with water.

As shown here the device 300 has a main structure including a housing 301, here having feet resting on the ground.

The housing 301 has an openable compartment wherein the cleaning of the inserts 210 takes place. This compartment 302 has a door or hood 303 or other openable closure, so that in the closed state thereof the compartment is substantially sealed from the surroundings, e.g. to avoid escape of cleaning liquid, vapour, and/or odour, into the surroundings.

It is shown here that the bottom zone of this compartment form the collector device 350, wherein cleaning liquid is collected. A first filter 370, e.g. a filter plate, may be arranged in said bottom zone as a coarse filter. A second filter 371 is finer and/or operates on a different filtering technique.

The device 300 has a computerized controller 500 of which embodiments will be discussed in more detail below.

FIGS. 10-13 illustrate an embodiment of the inserts carrier 400. The carrier may be mounted permanently to the device 300 but could also be embodied as an exchangeable inserts carrier 400 as discussed herein.

The inserts carrier 400 is configured to temporarily mount thereon multiple, here four, inserts 201 at respective insert mounting positions 401,402,403, 404.

The inserts carrier 400 has at each mounting position thereof a chamber 410 that is open at one side. The inserts carrier 400 is embodied and used to mount one or more inserts, here a single insert 210 as is preferred, thereon such that the inner or the outer face(s) thereof, here the inner face as is preferred, covers said open side of the chamber 410 and the chamber 410 is sealed at said one side. In general terms the feed duct can be in communication with the chamber 410, so that the liquid that is fed to said chamber 410 is forced through the permeable body of the insert 210 at the mounting position.

The FIGS. 10-13 illustrate the presence of clamping assemblies 430, that are adapted and used to releasably clamp each of the inserts 210 onto the mounting positions of the inserts carrier. As shown here each insert 210 may have a circular periphery and each clamping member may comprise or be formed (as shown) by a ring 431 that can be arranged about the insert. For example, the ring 431 is embodied to be secured on the inserts carrier, e.g. the mounting location of the inserts carrier having a threaded portion and the ring having a mating threaded portion.

It is shown here that the inserts carrier 400 comprises at the mounting positions thereof one or more sealing members 400 that are configured and used to sealingly engage the one or more inserts 210 mounted at their respective mounting positions.

The FIGS. 10-13 illustrate that the inserts carrier has a feed duct portion 310a, and a distribution manifold 450 where branch ducts start.

It is illustrated that the inserts carrier 400 is provided with multiple branch ducts 415, 416, 417, 418, each leading to a corresponding mounting position 401, 402, 403, 404 of the inserts carrier, here to the respective chamber 410 at each mounting position.

The manifold 450 may be non-valved, yet the manifold could also be integrated with a valve.

In a practical embodiment an exchangeable inserts carrier of this configuration has a feed duct connector assembly that is configured to releasably couple to the feed duct of the main structure of the inserts cleaning device 300, e.g. via a quick-connector.

The feed duct, e.g. the branch duct associated with mounting position, is in communication with the respective chamber 410, so that cleaning liquid fed to said chamber 410 is forced through the permeable body of the insert 210 at said mounting position.

It is illustrated that the inserts carrier 400 has multiple chambers with their open sides in a common plane.

For example, the inserts carrier has four, five, six, seven, eight, or more chambers 410.

Preferably, at least 75% of portion of the inner face that is permeable for liquid is unhindered exposed to the liquid in a chamber 410 of the inserts carrier, allowing for relatively unhindered entry of liquid into the permeable volume of each insert via the inner face thereof.

Figure 14:
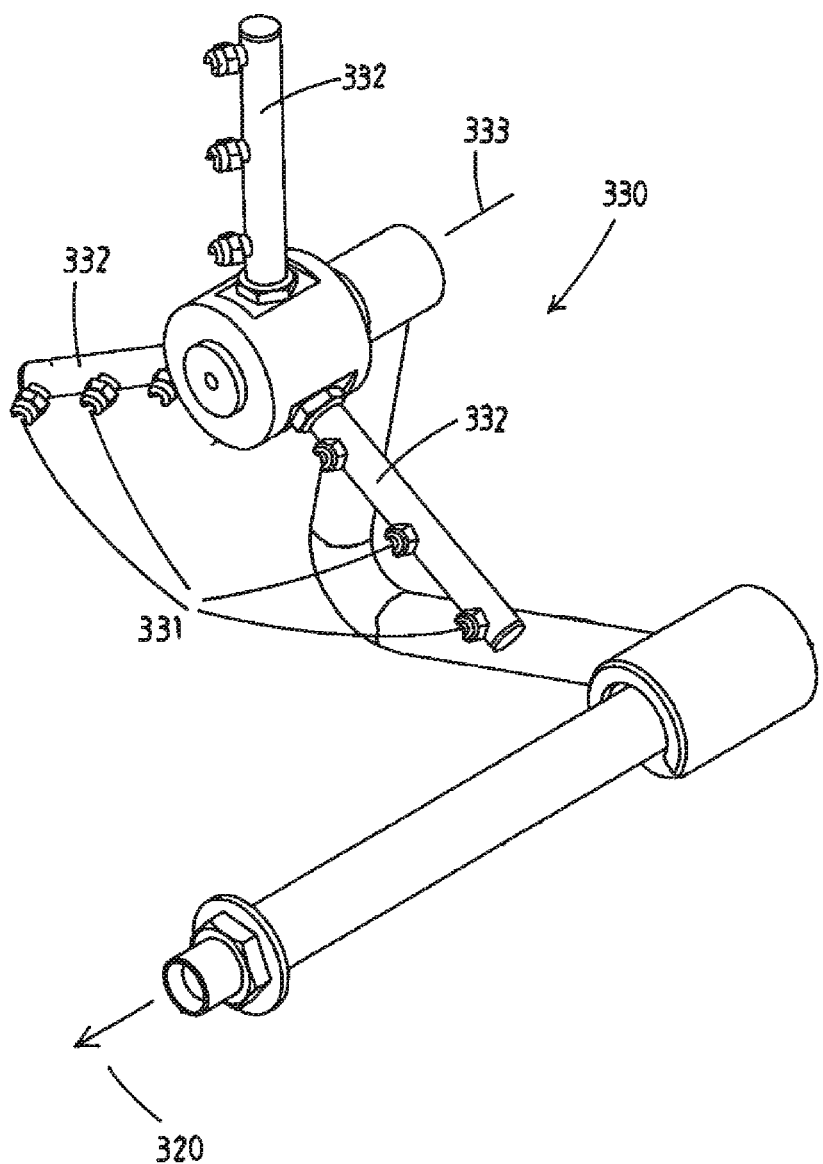
FIG. 14 shows a spray device of the cleaning device of FIG. 9.

FIG. 14 shows the spray device 330, which—as preferred—is also arranged within compartment 302 of the housing 301 of the device 300.

The spray device 330 is configured and operated to spray cleaning liquid, e.g. at least onto the exposed face, here outer face, of the inserts 210 mounted on the inserts carrier 400. In an embodiment, as shown, a spray device comprises one or more mobile spray nozzles 331 that are moved relative to the inserts 210 during the cleaning, e.g. (as shown) the inserts carrier 400 remaining stationary and the one or more spray nozzles 331 being in motion. Here the nozzles 331 are mounted on a rotary structure, here with spray arms 332, that can revolve about an axis 333, e.g. a horizontal axis 333. A cleaning liquid feed duct of the spray device 330 connects to pump 320, or a different pump when desired. A valve may be provided to control flow of cleaning liquid to the spray device.

For example, the spray device 330 is operated simultaneous with cleaning of the inserts by cleaning liquid fed by the pump 320 as discussed herein during one or more phases of the cleaning process. For example, the spray device has spray nozzles 331 directing jets onto the outer faces of the inserts 210 carried by the inserts carrier 400. The provision of one or more spray devices 330 is in particular envisaged for embodiments wherein the inserts are held on the inserts carrier such that one face of the inserts, preferably the inner face, is directed towards the chamber(s) of the inserts carrier 400 whereas the other face, e.g. the outer face of the inserts, is freely exposed, so that the one or more spray devices can be configured to spray at least onto said exposed face of the inserts.

It will be appreciated that cleaning liquid sprayed onto the inserts 210 is collected by the collecting device of the inserts cleaning device 300.

Figures 15, 16:
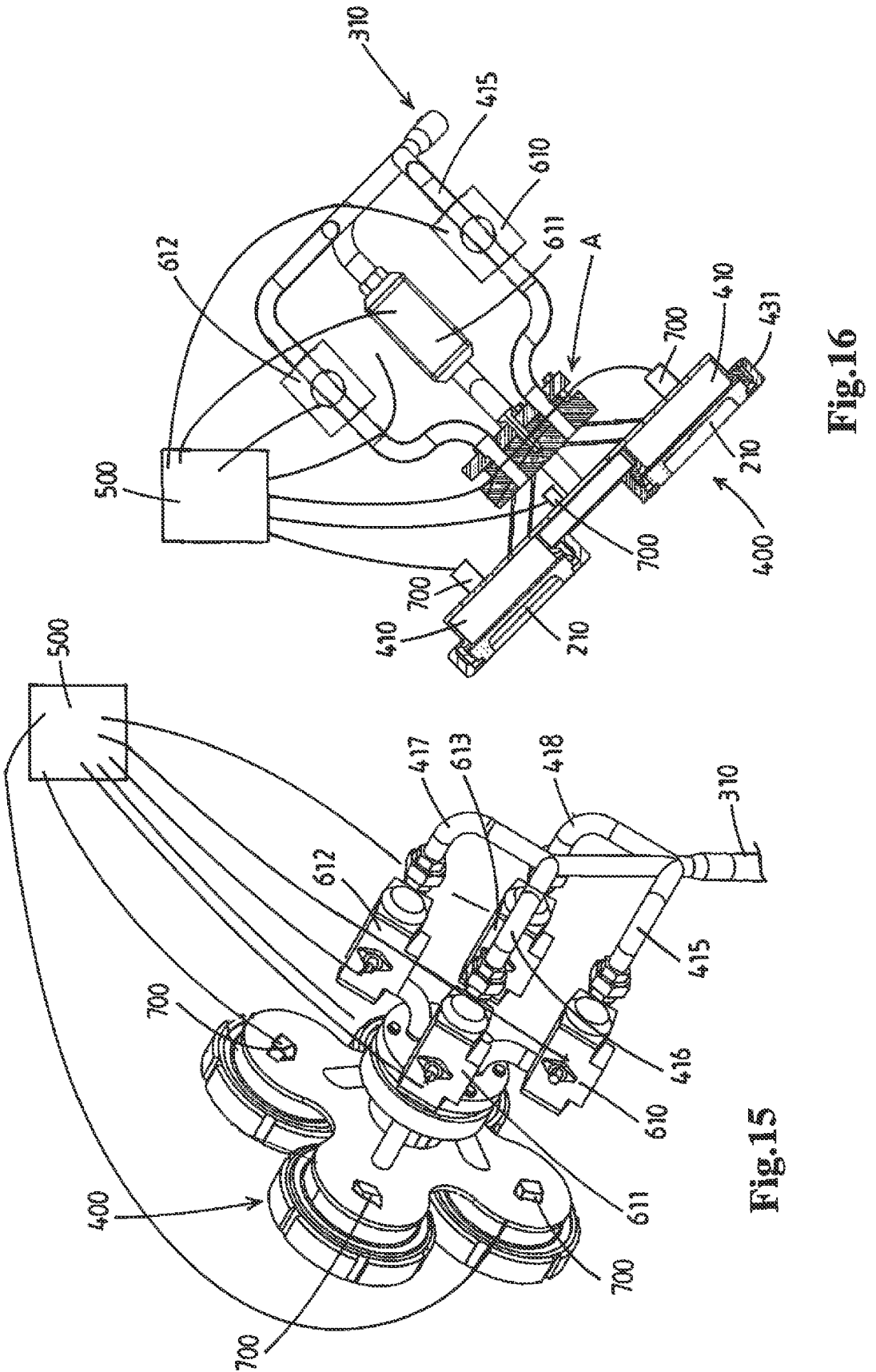
FIG. 15 shows an embodiment of an insert cleaning device or inserts carrier thereof according to the invention.
FIG. 16 shows a cross section of the insert cleaning device or inserts carrier of FIG. 15.

FIGS. 15 and 16 illustrate an embodiment of the provision of a valve arrangement as discussed herein.

In general it is illustrated here that the inserts cleaning device has a common feed duct 310 and multiple branch ducts 415, 416, 417, 418 that are connected to the common feed duct and that each extend to a respective mounting position 402, 403, 404 of the inserts carrier. Herein, as preferred, each mounting position is embodied to receive just one insert 210, so that a flow of liquid through one branch duct reaches just one insert.

As preferred, a valve arrangement 600 is provided that allows to selectively open and close each branch duct 415, 416, 417, 418. It is shown here that a valve 610, 611, 612, 613, e.g. a ball valve, is associated with each branch duct. It is shown here that each valve 610, 611, 612, 613 is controlled electrically, e.g. by means of the controller 500 of the cleaning device 300, e.g. a computerized controller. This design allows for advantageous approaches for cleaning the inserts 210. For example, as discussed above, one can now pass all of the output of the pump to just one insert 210, e.g. in view of creating—during one or more phases of a cleaning cycle—a maximized flow of cleaning liquid through the one insert as all other branches are then closed. One can now also monitor the one active flow of liquid, and derive from said monitoring the progress of the cleaning of the insert.

The inserts cleaning device 300 has a computerized controller 500 that is linked to the valve arrangement 600 to perform a preprogrammed routine including opening and closing of one or more of the valves 610, 611, 612, 613, e.g. the routine being selected from a set of preprogrammed routines. For example, the computerized controller has a memory wherein for multiple distinct inserts and/or multiple distinct inserts carriers respective preprogrammed cleaning routines are stored.

It is shown in FIGS. 15, 16 that the inserts carrier 400 is permanently mounted to the device 300, with the valves also being part of the main structure of the device 300. However one can also provide for an exchangeable carrier 440, which could include the valves 610, 611, 612, 613, are just the part with the mounting positions and the branch ducts, e.g. a coupling being provided at arrow A in FIG. 16 between the carrier 400 and the main structure of the device 300.

A particular advantage is achieved when all exchangeable inserts carriers 400 of the installation have a common interface with the main structure of the one or more inserts cleaning devices 300. This allows for an operation wherein each exchangeable inserts carrier 400 can be mounted to each of the one or more inserts cleaning devices 300 of the installation. For example, the interface merely comprises a mechanical coupling to the main structure of the inserts cleaning device, which coupling may also comprise the fluidic connection between the inserts carrier and the liquid duct arrangement of the main structure of the cleaning device. As discussed the interface may also be more extensive, e.g. in view of the presence of a valve arrangement and/or of one or more sensors, etc., on the inserts carrier.

In particular when one or more valves and/or sensors are mounted on the inserts carrier, and more in particular when said carrier 400 is exchangeable, the inserts cleaning device 300 may be configured for wireless communication between one or more components on the inserts carrier 400 on the one hand and an associated circuitry on a main structure of the cleaning device 300 on the other hand.

FIGS. 15, 16 also serve to illustrate that the inserts cleaning device, and/or the inserts carrier (as here), is/are provided with one or more sensors 700 that measure the flow and/or pressure of the cleaning liquid. For example, one or more flowrate sensors measure a flow that is representative for the flow through the one or more permeable bodies during cleaning, e g said measurement(s) being used to determine the progress of the cleaning process and/or the remaining degree of soiling of the permeable body during the cleaning process.

FIGS. 15, 16 also serve to illustrate that the inserts cleaning device, and/or the inserts carrier, is/are provided with one or more temperature sensors 700 that measure the temperature of the cleaning liquid, for example one or more temperature sensors being mounted on the inserts carrier 400, e.g. in proximity to each of the mounting positions thereof, e.g. measuring the temperature to which each insert 210 at said mounting position is exposed.

For example, the inserts carrier 400 has one or more pressure sensors 700 configured to measure the pressure of cleaning liquid at each mounting position, e.g. in each chamber 410, of the inserts carrier. This could be used to measure the pressure at selected moments during the cleaning process to which the one or more inserts is/are subjected in the inserts cleaning device, for example these measurements of pressure being done in conjunction with a known flowrate of the cleaning liquid through the one or more inserts mounted in communication with mounting position, e.g. the chamber 410, e.g. as the pump provides a constant and/or a known flowrate of the cleaning liquid. The measured pressure may then be regarded as representative of the progress of the cleaning process, e.g. the insert 210 being considered sufficiently clean at a certain pressure.

Figure 17:
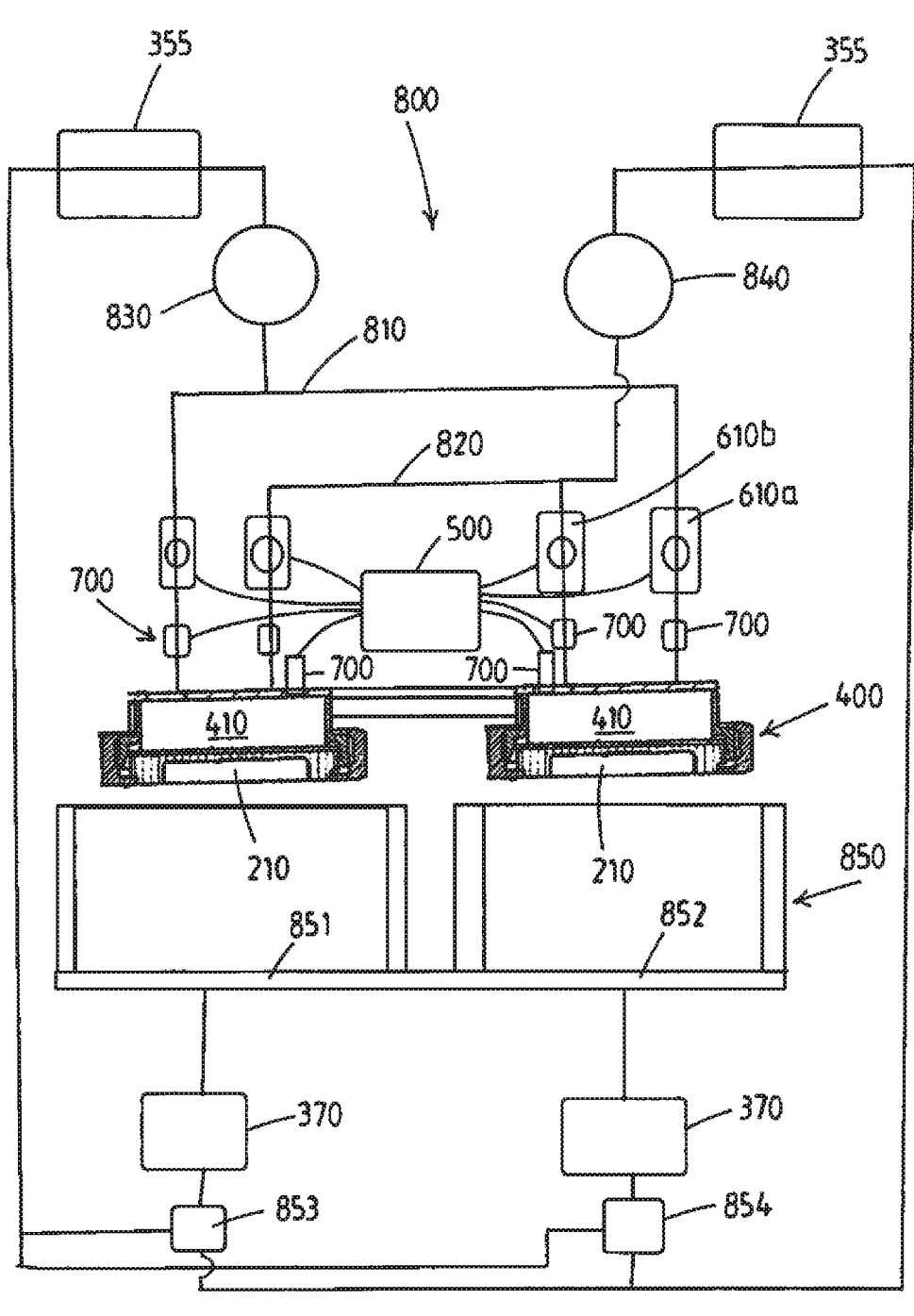
FIG. 17 shows schematically, partly in cross-section, an embodiment of an insert cleaning device of the invention.

FIG. 17 illustrates an embodiment wherein the inserts cleaning device 800 has one or more first cleaning liquid feed ducts 810, e.g. with branch ducts as discussed herein, and one or more second cleaning liquid feed ducts 820, e.g. with branch ducts as discussed herein. Each of the first and second feed ducts 810, 820 lead to the one or more mounting positions of the inserts carrier 400. A first pump 830 and a second pump 840 are provided, connected respectively to the first and second liquid feed ducts 810, 820. This arrangement generally may allow for an operation method wherein the first pump 830 is used to feed a first cleaning liquid to the one or more mounting positions and wherein the second pump is used to feed a second cleaning liquid to the one or more mounting positions. Herein the first and second liquids may differ from one another in at least one property thereof, such as pressure, flow rate, temperature, composition.

In an embodiment, during a phase of the cleaning process, only the first liquid is fed to the one or more mounting positions and during another phase of the cleaning process only the second liquid is fed to the one or more mounting positions. For example, the first liquid is plain or pure water, e.g. heated water or cold water, and the second cleaning liquid is water mixed with one or more cleaning agents, e.g. acidic agent(s), bacteriostatic agent(s), etc. In another embodiment both the first and second cleaning liquid are water-based cleaning agents, e.g. of different pH levels.

It is shown here that each chamber 410 is connected to both feed ducts 810, 820, wherein a valve arrangement 600 is provided for each connection between a chamber and a feed duct, to selective open and close the connection between each chamber 410 and each of the feed ducts. So valves 610, 611, 612, 613 are provided in a double configuration.

It is also shown that one or more sensors 700 are provided, as discussed herein. For example, flow rate sensors 701 and pressure sensors 702.

The FIG. 17 also illustrates that the inserts cleaning device has a first collector system including a collector device as well as a second collector system including a collector device, each of these first and second collector systems being operated to collect a respective first cleaning liquid and second cleaning liquid that is forced through the permeable volume of one or more inserts.

The collector device 850 has a collector member 851, 852 for each mounting position, so as to receive flow from the one or more inserts 210 at said position. Each collector member 851, 852 can be connected, via respective valves 853, 854 to a recirculation assembly that leads back to one of the pumps 830, 840.

Figure 18:
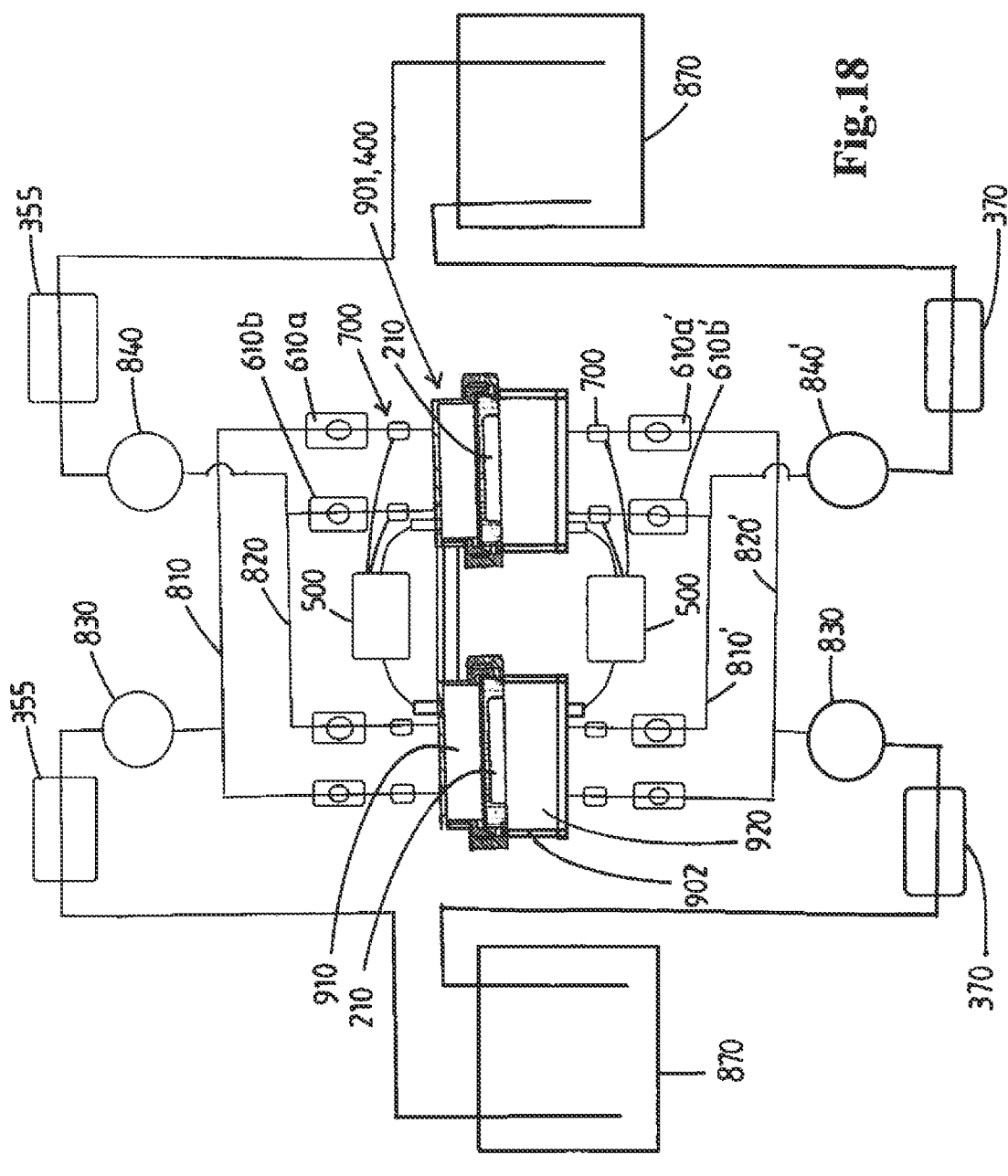
FIG. 18 shows schematically, partly in cross-section, yet another embodiment of an insert cleaning device of the invention.

FIG. 18 illustrates an inserts cleaning device 900 configured to clean inserts 210 that have been temporarily detached from a moulding device for moulding food products from a pumpable foodstuff mass.

The inserts cleaning device 900 comprises a first component 901, e.g. an inserts carrier 400 as described herein, that delimits a first chamber 910 having an opening, and a second component 902, e.g. a housing as described herein, that delimits a second chamber 920 having an opening. The first and second components 901, 902 are configured such that an insert 210 to be cleaned can be placed at least with its permeable volume 215 between the first and second chambers 910, 920 so that the first and second chambers are opposite one another. At least the first chamber 910 is connected to a cleaning liquid feed duct 810 thereby allowing for feeding cleaning liquid by a pump 830 of the inserts cleaning device 900 via the cleaning liquid feed duct to the first chamber 810, which cleaning liquid then passes through the permeable volume of the insert 210 and exits the permeable volume to arrive in the second chamber 820. The cleaning liquid is discharged from the second chamber, e.g. recirculated via a recirculation assembly as described herein.

As can be seen it is possible for each of the components 901, 902 to be associated with a feed arrangement as discussed herein, e.g. with reference to FIG. 17. In operation the flow will be in one direction so that a feed arrangement associated with one component acts as feeder of cleaning liquid and the other arrangement acts as recirculation assembly for the liquid.

FIG. 18 illustrates that the inserts cleaning device 900 may have a cleaning liquid circuit further comprises a tank 870, which may be atmospheric or pressurized, in order to have a buffer of cleaning liquid for example, e.g. as part of the recirculation assembly and/or the feed assembly.

Figure 19:
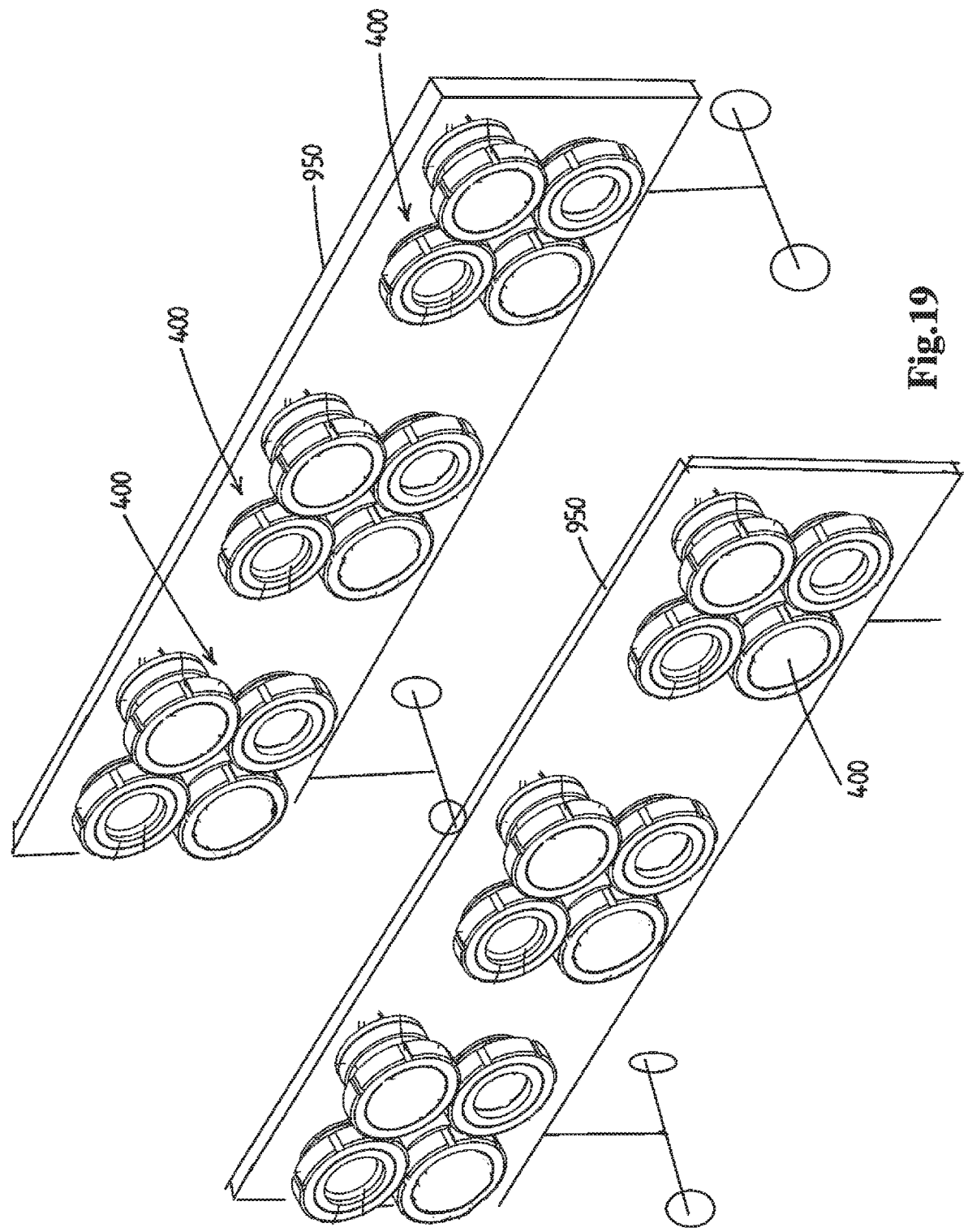
FIG. 19 shows schematically the provision of one or more carts for transportation of one or more inserts carriers according to the invention.

FIG. 19 illustrates that use is made of multiple exchangeable inserts carriers 400 that are each connectable to and detachable from a main structure of the inserts cleaning device, as well as use is made of one or more carts 950 that are each configured and used to transport one or more inserts carriers 400 between the inserts cleaning device and a remote location.

Figure 20:
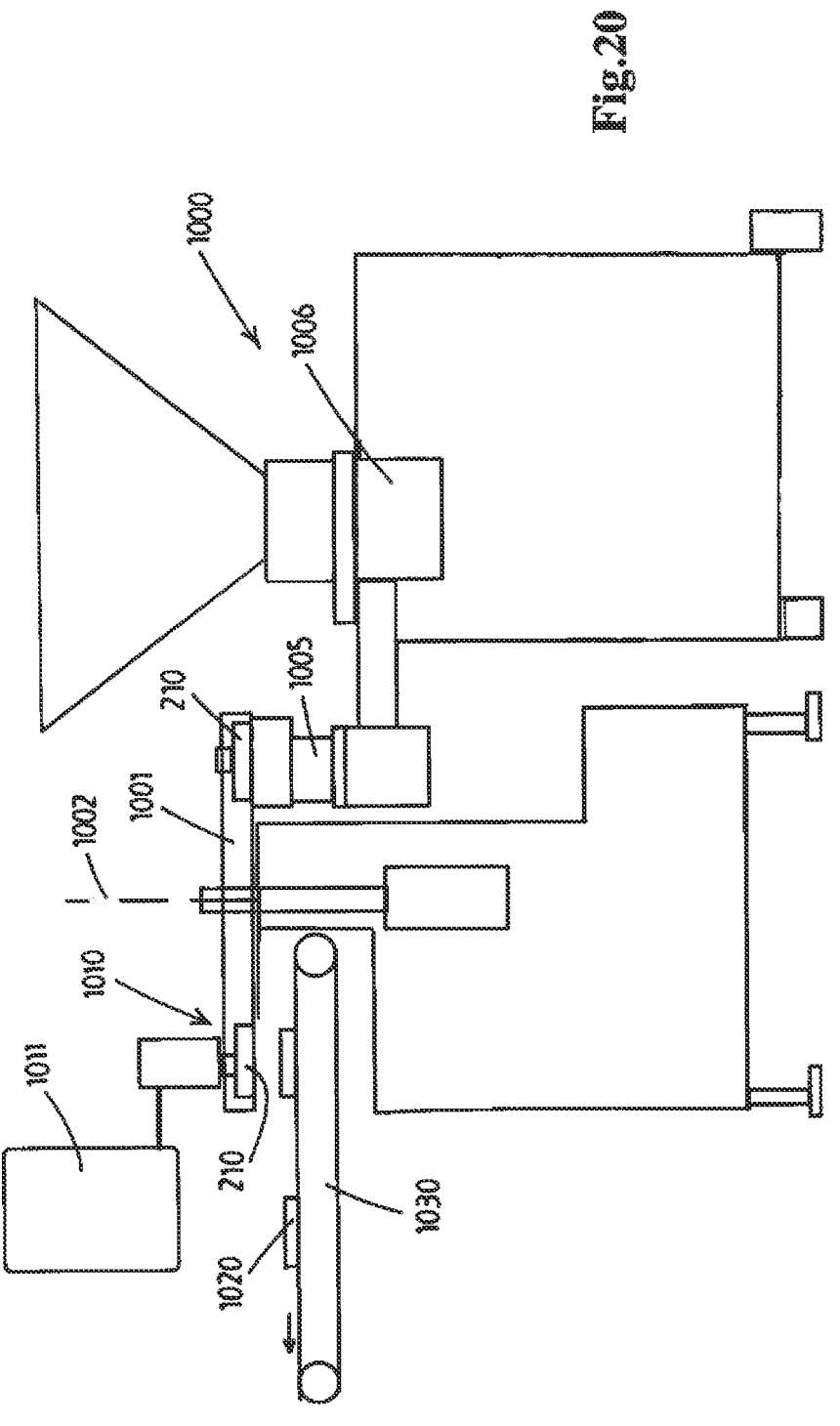
FIG. 20 shows schematically a turret type moulding device having a movable mould member with detachable inserts to be cleaned according to the invention.

FIG. 20 illustrates a turret type moulding device 1000. Herein the movable mould member is a disc shaped mould member 1001 that revolves about a vertical axis 1002, e.g. with an intermittent motion. The disc shaped mould member is provided with one or more circular arrays of mould cavities, each cavity being formed by a respective detachable insert 210. In embodiments, as here, the openings of the cavities of the inserts 210, are on the underside of the revolving disc shaped mould member 1002 so that transfer of foodstuff mass into each cavity is performed from below by means of an appropriate mass feed member 1005 and pump 1006. At the ejection location 1010 an ejection fluid, e.g. pressurized air, is fed (here from source 1011) to the inner face of the insert 210, to assist in the release of the formed food product. The ejected food product 1020 is received on discharge conveyor 1030 and discharged.

Figure 21:
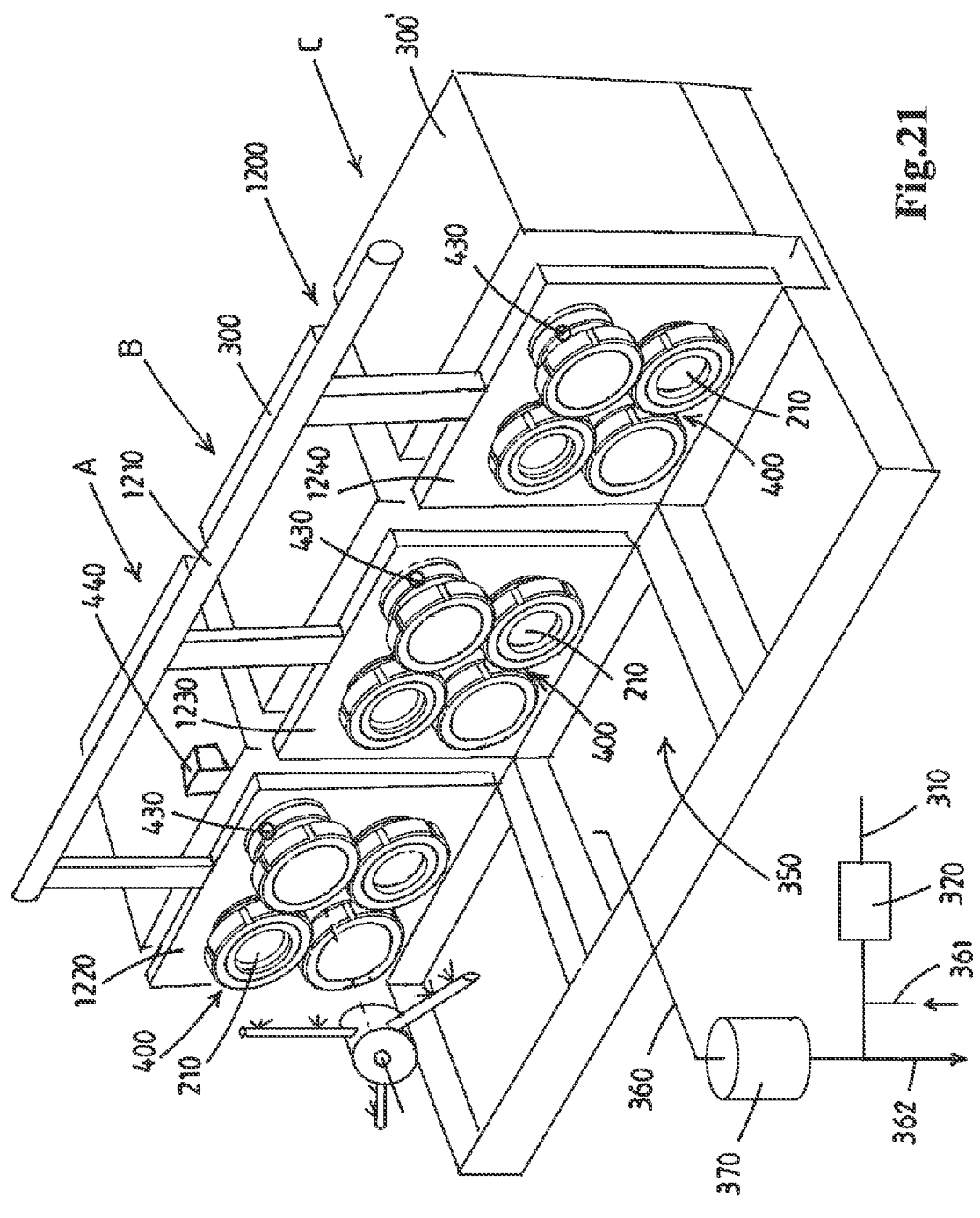
FIG. 21 shows schematically an installation according to the second aspect of the invention.

FIG. 21 shows schematically part of an installation according to the second aspect of the invention.

The installation comprises a moulding device for moulding the food products from a pumpable foodstuff mass, the moulding device comprising a movable mould member having food product moulding inserts that are temporarily detachable for cleaning, wherein each food product moulding insert has:

an outer face, one or more recessed mould cavities, each mould cavity defining a shape of the product, which is to be moulded, the mould cavities each having an opening in the outer face for the introduction of foodstuff mass into the mould cavity and for the ejection of the moulded product, an inner face, a permeable volume between the inner face and the one or more mould cavities, said permeable volume comprising openings opening out at the one or more mould cavities of the insert, wherein the moulding device is configured to cause, in operation of the moulding device, a passing of pressurized ejection fluid from the inner face of the insert through the permeable volume to the mould cavity in order to assist release of the food product formed in the mould cavity from the insert. Examples of such mould devices have been discussed herein in many embodiments, for example reference is made to FIGS. 1-7, and 20.

In this illustration it is assumed that inserts 210, e.g. of an embodiment as discussed herein, are to be cleaned after their detachment from the respective mould member of the moulding device.

In this illustration inserts carriers 400 are shown, e.g. of an embodiment as discussed herein. The inserts 210 to be cleaned have been mounted at the mounting positions of the inserts carriers 400. As explained, the inserts carriers 400 may be exchangeable inserts carriers 400 which in the context of the second aspect of the invention may also entail their releasability from the motion system of the installation. This, as explained, allows for example to use the carriers 400 also for transportation of the inserts 210 between the location of the cleaning system and some remote location(s), e.g. in proximity of the moulding device and/or in a storage facility.

In this example the inserts cleaning system comprises three cleaning stations, here indicated as A, B, and C. Of course, another number of multiple cleaning stations can be provided for. The inserts cleaning system is configured to subject the inserts carried by at least one of said one or more inserts carriers 400 to a cleaning related treatment at each cleaning station.

At station A, in this example, one or more spray devices 1050 are provided, e.g. as described herein. For example, as here, just one station A of the installation has only one or more spray devices 1050, configured and operated to spray onto an exposed surface of the inserts, e.g. in a first phase of a cleaning process. The station A may comprise, as preferred, a pump, a collector device, a cleaning liquid recirculation assembly extending from the collector device to the pump, and filter device arranged in the first recirculation assembly.

At station B the first inserts cleaning device 300 for example generally is with the structure as discussed with reference to FIG. 9. The inserts cleaning device 300 comprises:

a first cleaning liquid feed duct 310, a first pump 320 connected to the first cleaning liquid feed duct, a first collector device 350 for collecting first cleaning liquid, a first cleaning liquid recirculation assembly 360 extending from the first collector device to the first pump 320, a first filter device 371 arranged in the first recirculation assembly.

The first inserts cleaning device 300 and the inserts carrier 400 are configured such that, in afunctional position of the inserts carrier 400 relative to the station B, the first inserts cleaning device 300 is operable to feed to first cleaning liquid by means of the first pump 320 to the inserts 210 mounted at the mounting positions of the inserts carrier 400. This first cleaning liquid is then forced through the permeable volume 215, exiting the permeable volume, e.g. at the side of the mould cavity, and being collected by the first collector device 350 and recycled to the first pump 320, e.g. being filtered by filter device 370.

For example, as discussed herein, at station B, the carrier 400 is connectable to a main structure of the inserts cleaning device 300, e.g. in order to supply the cleaning liquid from pump 320 to each of the inserts 210 (here four) mounted on the carrier 400. For example, the motion system is configured to bring about said connection in an automated manner.

At station C the second inserts cleaning device 300' is generally similar in structure as the device 300 and as the device discussed with reference to FIG. 9. Therefore, main features of this device 300' are not shown in FIG. 21. The device 30', for example, comprises:

a second cleaning liquid feed duct, a second pump connected to the second cleaning liquid feed duct, a second collector device for collecting second cleaning liquid, a second cleaning liquid recirculation assembly extending from the second collector device to the second pump, a second filter device arranged in the second recirculation assembly.

The second inserts cleaning device 300' and the inserts carrier 400 are configured such that, in a functional position of the inserts carrier at station C, the second inserts cleaning device 300' is operable to feed second cleaning liquid by means of the second pump to the inserts 210 mounted at the mounting positions of the inserts carrier 400. This second cleaning liquid is forced through the permeable volume and exists the permeable volume, e.g. at the side of the mould cavity. and being collected by the second collector device 300' and recycled to the second pump, e.g. filtered in the recirculation arrangement.

For example, as discussed herein, at station C, the carrier 400 is connectable to a main structure of the inserts cleaning device 300', e.g. in order to supply the cleaning liquid from pump 320 to each of the inserts 210 (here four) mounted on the carrier 400. For example, the motion system is configured to bring about said connection in an automated manner.

The installation of the second aspect of the invention also comprises a motion system 1200 that configured and operated to bring each of the inserts carriers 400 in a condition with the inserts 210 mounted thereon at respective insert mounting positions into a functional position relative to each of the cleaning stations, A, B, C, so that in said functional position of the inserts carrier 400 the cleaning system is operable to subject the inserts 210 mounted thereon to a cleaning related treatment.

The motion system 1200 is also configured to move the inserts carrier 400 with the inserts 210 mounted thereon from a functional position relative to one of said cleaning stations to a functional position relative to another one of said cleaning stations in order to subject the inserts mounted on said inserts carrier to a sequence of cleaning related treatments by means of the inserts cleaning system.

For example, the inserts 210 mounted on a carrier 400 are first subjected at station A to a spraying treatment wherein the one or more spray devices at station A spray onto exposed surfaces of the inserts. Once the treatment at station A has been completed, the motion system 1200 moves the carrier 400 to station B.

For example, the inserts 210 are arranged as described with reference to any of FIGS. 10-13, 15-17, so that in operation the first cleaning device at station B forces a first cleaning liquid through the permeable volume of the inserts 210.

For example, the first cleaning liquid is water mixed with one or more agents, e.g. as discussed herein.

For example, station B, or any other station, is configured to have an arrangement as described herein, wherein liquid can be forced in two directions through the permeable volume, e.g. as discussed with reference to FIG. 18.

Once the cleaning treatment at station B has been completed, e.g. said completion being detected as described herein, the system 1200 moves the carrier 400 into a functional position at station C.

For example, the inserts 210 are arranged as described with reference any of FIGS. 10-13, 15-17, so that in operation the second inserts cleaning device at station C forces a second cleaning liquid through the permeable volume of the inserts 210.

For example, the second cleaning liquid is pure water, so not mixed with one or more agents, e.g. as discussed herein.

A further cleaning station of the installation, not shown here, could be embodied as a drying station, e.g. to dry the inserts held by carrier 400 as a final phase of the cleaning process, e.g. downstream of station C.

It will be appreciated that the cleaning stations could each have a respective housing, but it is also envisages that multiple stations, possibly all stations share a common housing.

In FIG. 21 it is illustrated schematically that the motion system 1200 comprises a rail assembly 1210 and one or more receivers 1220, 1230, 240, that are each displaceable along the rail assembly 1200. As shown the rail assembly 1210 extends to each of the multiple cleaning stations, here A, B, and C. Each of the receivers 1220, 1230, 240, is configured to receive one or more inserts carriers, here just one, so that an inserts carrier 400 with the inserts 210 mounted thereon at respective insert mounting positions is movable into the functional position relative to each of the cleaning stations.

The installation may further comprise a tunnel or another shielding arrangement through or within which the motion system moves the one or more carriers from one station to another station.

One or more closure devices or barriers, separations, or the like could be present at each cleaning station to form a compartment wherein the inserts 210 are subjected to the cleaning treatment, e.g. to avoid cleaning liquid and/or fumes, etc. from escaping into the environment.

The installation could, in embodiments comprises one or more loading and/or unloading stations, where an inserts carrier is brought into engagement with a receiver of the motion system and/or disengaged from the receiver.

As explained one advantageous effect of the second aspect of the invention is that the stations B, C each have their own liquid to treat the inserts. So, the stations as well as the handling of the liquid may be optimized for each station, e.g. avoiding the need to switch the liquid during operation of an inserts cleaning device. Such a switching costs time and may require emptying or rinsing the ducting of the cleaning device, ahead of introducing the other liquid. The second aspect of the invention may be applied to avoid, or at least reduce the need for such switches.

As shown the installation of the second aspect of the invention, that is the cleaning system thereof, may be operated to simultaneously treat inserts at multiple, e.g. at all, stations so that an enhanced capacity is achieved for cleaning.

The installation of the second aspect of the invention, that is the cleaning system thereof, may be configured so that at least two station have identical inserts cleaning devices. This allows may be beneficial in view of redundancy.

FIG. 21 also illustrates that each inserts carrier 400 is provided with a respective identifier 430, e.g. an optically readable code, an RFID tag, etc. The installation comprises a reader configured to read these identifiers 430, e.g. in order to identify the inserts carriers 400. For example, a reader 440 is arranged at one or more stations, e.g. at the first station of a cleaning system, here at station A. One or more readers 440 could, for example, be arranged at a loading and/or unloading station(s) of the installation. A receiver 1220, 1230, 1240, could also be provided with a reader 440, for example. The installation could be operated so that the identification is used to log the cleaning events and/or the use of each insert and/or each inserts carrier over time.

The invention claimed is:

1. An installation for production of food products, said installation comprising:
   a moulding device for moulding the food products from a pumpable foodstuff mass, the moulding device comprising a movable mould member having a movable mould member base and food product moulding inserts, wherein the food product moulding inserts that are temporarily detachable from the mould member base for cleaning, wherein each food product moulding insert has:
   an outer face,
   one or more recessed mould cavities, each mould cavity defining a shape of the product, which is to be moulded, the mould cavities each having an opening in the outer face for the introduction of foodstuff mass into the mould cavity and for the ejection of the moulded product,
   an inner face,
   a permeable volume between the inner face and the one or more mould cavities, said permeable volume comprising openings opening out at the one or more mould cavities of the insert,
   such that each mould cavity of the insert is delimited at least in part by a permeable volume, to allow for, in operation of the moulding device, passing of pressurized ejection fluid from the inner face through the permeable volume to the mould cavity in order to assist release of the food product formed in the mould cavity from the insert,
   an inserts cleaning device, comprising:
   an inserts carrier configured to temporarily mount thereon multiple food product moulding inserts, that have been temporarily detached from the movable mould member base, at respective insert mounting positions,
   one or more cleaning liquid feed ducts, a pump connected to the one or more cleaning liquid feed ducts, the one or more liquid feed ducts leading from the pump to the mounting positions of the inserts carrier, a collector device for collecting cleaning liquid, a cleaning liquid recirculation assembly extending from the collector device to the pump, a filter device arranged in the recirculation assembly.

2. The installation according to claim 1, wherein the installation comprises one or more exchangeable inserts carriers, wherein each exchangeable inserts carrier is connectable to a main structure of the inserts cleaning device, which main structure comprises the cleaning liquid pump, at least a portion of the liquid feed duct, the recirculation assembly, and the filter device.

3. The installation according to claim 2, wherein the installation comprises multiple moulding devices, each having a movable mould member base from which food product moulding inserts can be temporarily detached for cleaning, wherein a lower number of insert cleaning devices is provided in the installation than the number of said multiple moulding devices, and wherein all inserts carriers are embodied as exchangeable inserts carriers that all have a common interface with the one or more inserts cleaning devices, so that each exchangeable inserts carrier can be mounted to each inserts cleaning device.

4. The installation according to claim 1, wherein the inserts cleaning device is configured so that a main structure of the inserts cleaning device receives multiple inserts carriers simultaneously.

5. The installation according to claim 1, the inserts carrier being provided with multiple branch ducts, each leading to a corresponding mounting position of the inserts carrier, wherein an inserts carrier has a feed duct connector assembly that is configured to releasably couple to a feed duct of a main structure of the inserts cleaning device, wherein each inserts carrier is provided with a valve arrangement, having one or more controllable valves for controlling flow of the cleaning liquid through a branch duct.

6. The installation according to claim 1, wherein one or more branch ducts of an insert carrier are connected to a common cleaning liquid feed duct, and wherein the installation comprises a valve arrangement that is controlled by a controller, so that during one or more phases of the cleaning of the inserts, one or more branch ducts of an insert carrier are closed whilst one or more other branch ducts connected to the same common cleaning liquid feed duct are open, wherein during said one or more phases all branch ducts except for one branch duct are closed, wherein the valve arrangement is operated to sequentially open one branch duct after another branch duct, whilst closing or keeping closed all other branch ducts.

7. The installation according to claim 1, wherein the inserts cleaning device comprises a valve arrangement configured to control flow of the cleaning liquid to each of the mounting positions individually, wherein the inserts cleaning device has a computerized controller that is linked to the valve arrangement to perform a preprogrammed routine including opening and closing of one or more valves.

8. The installation according to claim 1, wherein the inserts cleaning device is configured for wireless communication between one or more components on the inserts carrier and an associated circuitry on a main structure of the inserts cleaning device.

9. The installation according to claim 1, further comprising a mould member base cleaning device, distinct from the inserts cleaning device, which mould member base cleaning device is used to clean the mould member base once the inserts thereof have been detached.

* * * * *